(12) United States Patent
Goren et al.

(10) Patent No.: US 7,246,671 B2
(45) Date of Patent: Jul. 24, 2007

(54) STAIR-CLIMBING HUMAN TRANSPORTER

(76) Inventors: Michael Goren, c/o Heslin Rothenberg Farley & Mesiti, P.C., 5 Columbia Cir., Albany, NY (US) 12203; Jeremy E. Goren, c/o Heslin Rothenberg Farley & Mesiti, P.C., 5 Columbia Cir., Albany, NY (US) 12203

( * ) Notice: Subject to any disclaimer, the term of this patent is extended or adjusted under 35 U.S.C. 154(b) by 284 days.

(21) Appl. No.: 11/032,252

(22) Filed: Jan. 10, 2005

(65) Prior Publication Data

US 2006/0151218 A1 Jul. 13, 2006

(51) Int. Cl.
*B62D 51/06* (2006.01)
(52) U.S. Cl. .................................. 180/8.2; 180/209
(58) Field of Classification Search ............ 280/6.153, 280/6.154, 6.155, 6.156; 180/8.2, 8.3, 209
See application file for complete search history.

(56) References Cited

U.S. PATENT DOCUMENTS

| | | | |
|---|---|---|---|
| 3,438,641 A * | 4/1969 | Bradley | ..................... 280/5.28 |
| 4,569,409 A * | 2/1986 | Kluth | ......................... 180/8.2 |
| 4,790,548 A | 12/1988 | Decelles | |
| 5,676,215 A | 10/1997 | Misawa | |
| 5,701,965 A | 12/1997 | Kamen | |
| 5,833,248 A | 11/1998 | Eguchi | |
| 6,311,794 B1 | 11/2001 | Morrell | |
| 6,341,784 B1 | 1/2002 | Carstens | |
| 6,484,829 B1 | 11/2002 | Cox | |
| 6,615,938 B2 | 9/2003 | Morrell | |
| 6,695,084 B2 | 2/2004 | Wilk | |
| 2003/0127259 A1* | 7/2003 | Logstrup | ..................... 180/23 |

FOREIGN PATENT DOCUMENTS

GB 2201926 A * 9/1988

* cited by examiner

*Primary Examiner*—Paul N. Dickson
*Assistant Examiner*—Robert A. Coker
(74) *Attorney, Agent, or Firm*—Heslin Rothenberg Farley & & Mesiti P.C.

(57) ABSTRACT

A transportation vehicle and methods for transporting persons, robots or cargo, and more particularly motorized vehicles, and methods for transporting over surfaces, including surfaces such as floors, roads, paths and sidewalks, and surfaces having obstacles or inclined surfaces and for enabling the ascending or descending of stairs without tilting while supporting a user or a load on a frame. The vehicle uses horizontal extending and retracting rods and vertical extending and retracting rods to pass over an obstacle or ascend or descend stairs. The horizontal extending and retracting rods are used as mechanisms to move the first set of ground contacting modules located to the fore of the vehicle or the last set of ground contacting modules located to the aft of the vehicle in a fore-aft plane to pass over an obstacle or to position the first set or last set of ground contacting modules upon a stair to be used for ascending and descending stairs. The vertical extending and retracting rods are used to raise or lower the frame, to raise or lower individual ground contracting members and to keep the vehicle stable.

24 Claims, 30 Drawing Sheets

STAIR-CLIMBING HUMAN TRANSPORTER

FIELD OF USE

The present invention relates to a transportation vehicle and methods for transporting persons, robots or cargo and more particularly to vehicles and methods for transporting over surfaces, including surfaces having obstacles and slopes and for ascending or descending stairs, comprising a frame, coupled to a platform and using a plurality of vertical rods, each individually connected to an extending and retracting rod at the lower end of which is a ground contacting module, and each vertical rod individually connected to a plurality of horizontal rods and/or a plurality of extending and retracting horizontal rods, wherein horizontal rods arrayed fore to aft are each individually coupled to at least one transverse rod and an extending and retracting horizontal rod. When climbing over an obstacle or climbing a stairway the ground contacting modules and lower vertical rods may in any desired combination be retracted to lift the ground contacting modules off the surface, or the lower vertical rods may be extended to either place the ground contacting modules back on the surface or to lift the entire frame higher off the surface to maintain stability and keep the frame level. In addition, fore and aft horizontal extending and retracting rods may place the set of two ground contacting modules to the fore or the set of two ground contacting modules to the aft, farther or closer from the frame. At least one motorized drive causes the vehicle's ground contacting modules for locomotion over a surface and power(s) the retracting or extending rods to climb over obstacles or ascend or descend stairs in a safe and stable manner.

BACKGROUND

The embodiments of the present invention disclosed herein are vehicles, methods and systems for transporting persons, robots or cargo that enable efficient transportation, where such transportation is taken to broadly encompass movement of persons, robots and cargo over different surfaces, obstacles, difficult terrain and climbing stairs.

Humans and cargo are transported by many common forms of vehicles and transportation methods. Many of said vehicles have either one or two power-driven axles. Such vehicles may include wheelchairs, carts, carriages, automobiles, wagons, recreational vehicles, motorcycles, trucks, chariots, gurneys and the like. However, presently vehicles in use have several drawbacks.

First, typically such vehicles cannot climb stairs while keeping their platform and rider level. Also, such vehicles often cannot climb over certain obstacles or overcome obstacles such as a curb of a sidewalk. In addition, such vehicles typically cannot climb onto a van or truck without assistance from a ramp or a lift gate, while the van or truck is stationary or in motion. Generally, presently vehicles cannot easily maneuver over many obstacles.

Second, while there are many vehicles that can transport multiple individuals and a payload, many such vehicles are not lightweight and capable of navigating or climbing over obstacles, climbing stairs and also of transporting more than one individual rapidly on common surfaces such as roads and sidewalks. Wheelchair devices are not made to transport more than one individual, defeating the portability purposes of having a lightweight device for different terrains, stairs, and for common surfaces such as floors as well as for transporting more than one individual over obstacles and to locations which may be miles apart.

Most common vehicles such as automobiles, motorcycles, wheelchairs and gurneys, place all of their points of ground contacts such as wheels on the ground all at the same time, such that when there is an obstacle in the road, such vehicles must run over such obstacle. Often, this results in passengers either feeling bumps or having the entire platform or chassis incline rather than staying level. Some conditions present insurmountable obstacles for conventional two or four-wheel vehicles. As an exemplary, the bottom of a chassis or the axle of a vehicle may be incapable of moving over an obstacle. Presently most vehicles generally cannot climb stairs or over curbs of a sidewalk, or over certain obstacles.

Accordingly, it is desirable to create a device which solves the above disadvantages by improving the capabilities of vehicles to effectively climb stairs, climb over objects in their path yet still fulfill the goals of mobility and having the platform remain stable and level over larger distances for one or more passengers, or a robot and a payload. Such systems and vehicles may be used to provide efficient transportation for a broad range of users, including providing an assistive technology that fulfills the goals of flexible and portable transportation over a range of surfaces, over obstacles and for climbing stairs. This invention relates to a vehicle with horizontally extending and retracting rods for positioning ground contacting modules over and past an obstacle and upon stairs and with vertically extending and retracting rods for elevating or lowering the vehicle or for lifting or lowering ground contacting modules.

SUMMARY OF THE INVENTION

The present invention is directed to the efficient vehicle and methods of transportation over a range of surfaces, over obstacles and for climbing stairs. In one embodiment there is provided a vehicle for carrying one or more human users, or a robot and cargo where the user can sit or stand or where multiple users can sit or stand. In an aspect of the invention the vehicle can be manually controlled or actuated either onboard or remotely, while in another aspect it can be actuated by sensors.

The personal transportation vehicle comprises in accordance with this invention a load bearing frame and a plurality of vertical and horizontal rods slidably mounted with extending and retracting horizontal and vertical rods. Sets of ground contacting modules mounted on lower extending vertical rods connected to vertical rods fixed to the frame or fixed to extending and retracting horizontal rods. The extending or retracting horizontal rods at the fore and at the aft of the vehicle move to position ground contacting modules closer to the frame or to the fore or aft respectively. Embodiments of this invention are disclosed that implement the extension of horizontal extending and retracting rods for positioning a forward set or an aft set of ground contacting modules to reach over an obstacle or to extend to a stair whereupon the ground contacting module is thereafter positioned on the distal side of an obstacle or on a stair to provide stability. Further, embodiments of the invention are disclosed that implement lifting of the vehicle by use of a multiplicity of vertical rods that extend or retract to lift or lower the ground contacting members at the lower end of each of the vertical rods, or lift or lower the entire vehicle. In this fashion, a sequence of actions can lift a vehicle over obstacles or move such vehicle up or down stairs. Where desirable, the entire vehicle can remain level while the vehicle transverses an obstacle or climbs stairs or some other inclined terrain. It is further contemplated that the vehicle may be self propelled, powered by at least one motor and controlled either by the rider or by remote control and may also be controlled by sensors on board the vehicle. The vehicle is further comprised of ground contact modules coupled to lower vertical extension rods. A platform is connected to a frame which is then coupled to vertical and horizontal rods. Lasers, radar, sensors and video cameras can be placed in a variety of locations on the vehicle. In some embodiments sensors and video cameras may be placed to assist the person riding the vehicle to control the vehicle, and in other embodiments, for a remote person to control the vehicle by wireless communications. Each extending and retracting vertical rod can be individually controlled by a user. In some embodiments, control devices can include control levers, joy sticks, throttles, switches or other devices in communication with various motors and rods. By way of direction, such control devices can direct the vehicle to move forward, backward, left, right, up, down, sideways and can control the movement of each rod and motor. It will be appreciated by those in the art that such control devices used to navigate the vehicle can include alternative embodiments both on board the device and from remote locations. In this regard, the vehicle is suitable to a large number of uses including transportation over surfaces that normal four-wheeled vehicles travel upon, for navigating obstacles, for climbing and descending stairs, and also as assistive technology.

It is thereby desirable to create transportation vehicles, methods and systems that are effective in providing flexibility and ease of transportation over different surfaces, including without limitation, common surfaces such roads, sidewalks, paths, floors, surfaces with slopes and surfaces with obstacles and for ascending or descending stairs, to provide ease of use, comfort and portability to persons, robots and cargo. Accordingly, embodiments of the vehicle and methods disclosed herein address a need for efficient transportation over normal surfaces such as roads and floors, as well as a need to transport over conditions difficult for normal two or four-wheeled vehicles, such as obstacles, warehouse platforms or stairs, or onto structure or vehicles where ramps are typically employed to overcome the riser.

BRIEF DESCRIPTION OF THE DRAWINGS

The invention will be described with respect to particular embodiments thereof and reference will be made to the drawings in which.

DETAILED DESCRIPTION

Figure 1:
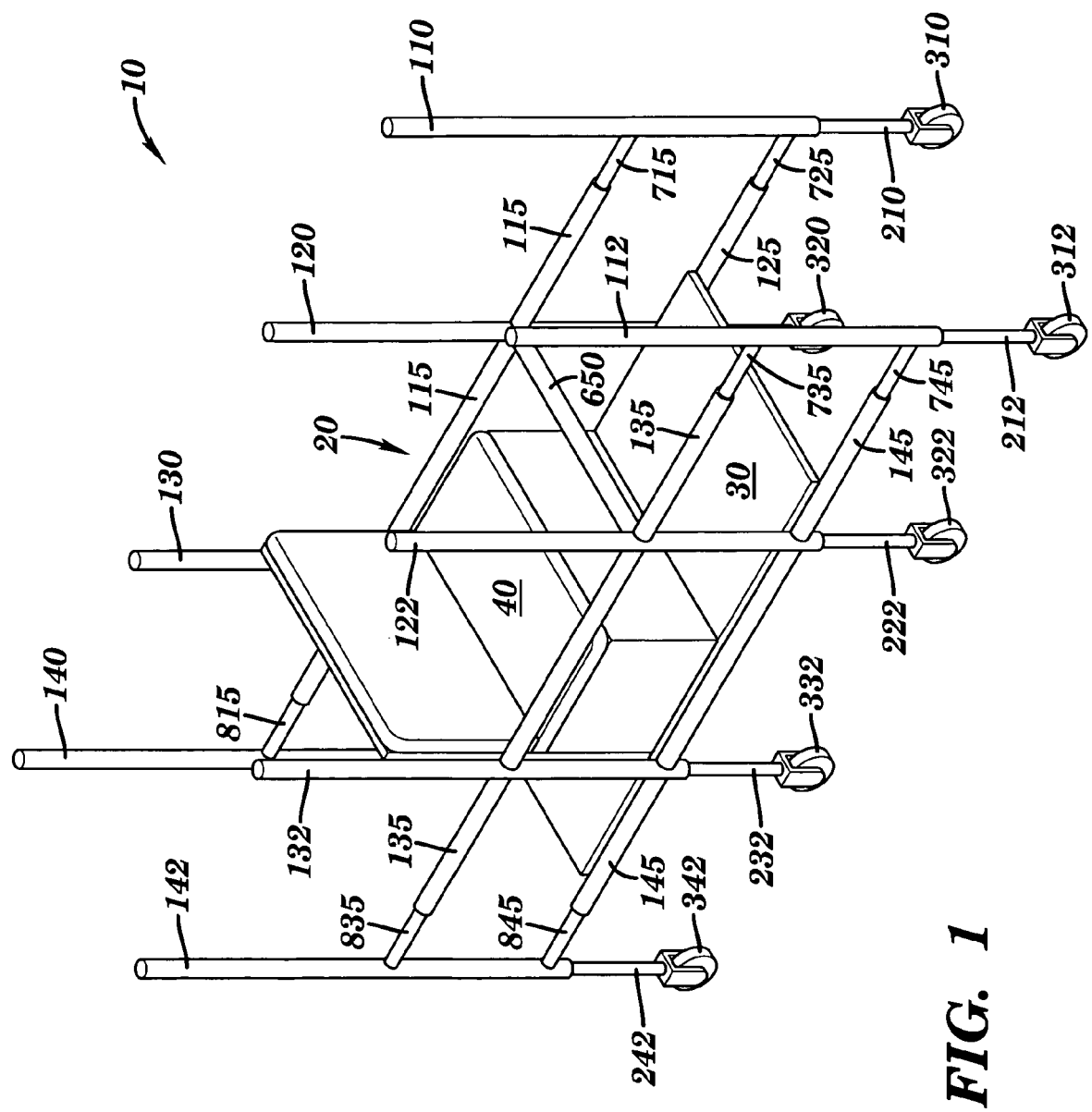
FIG. 1 is an isometric side view of a vehicle in accordance with a preferred embodiment for transportation
Figure 2:
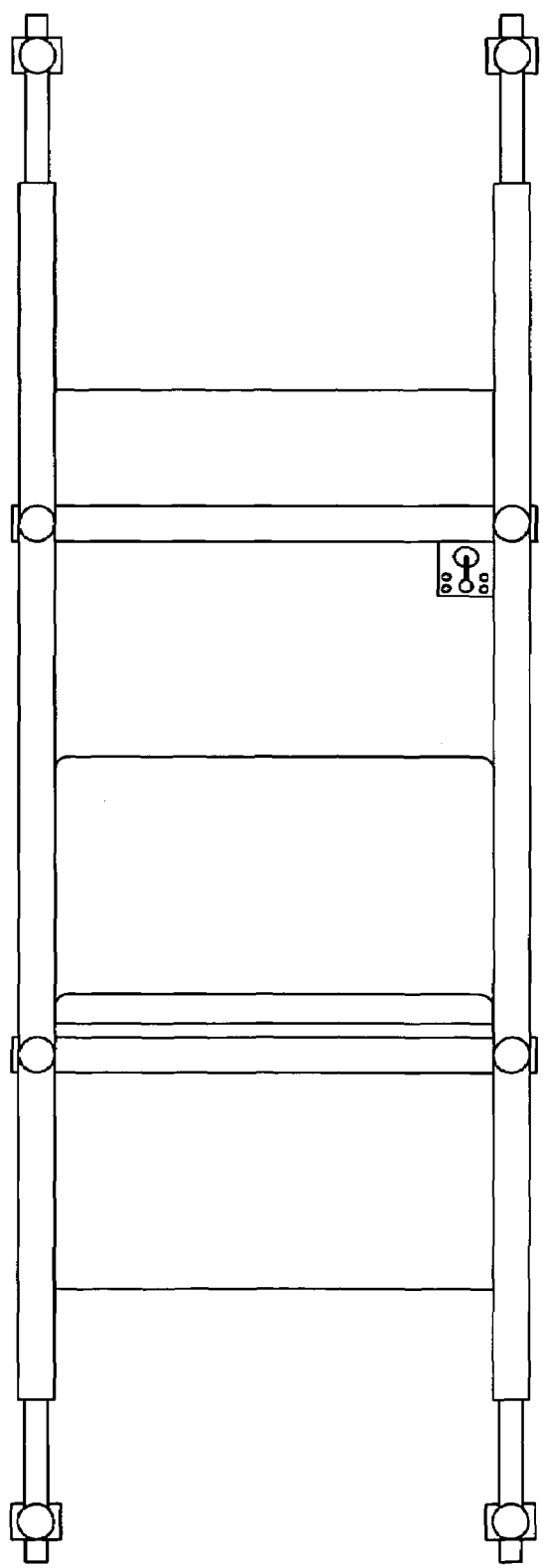
FIG. 2 illustrates a top plan view of the vehicle

Generally described, there is shown in FIG. 1 a vehicle designated by the numeral 10 according to the invention designed for maneuvering on underlying surfaces as well as over obstacles and for ascending and descending stairs. The vehicle has a frame 20 and a platform 30 secured thereto and in accordance with an embodiment of the present invention is designed to transport persons or a robot, and cargo in a safe and stable manner by including, a plurality of horizontal and vertical rods slidably mounted with extending and retracting horizontal and vertical rods respectively. Sets of ground contacting modules independently mounted on respective extending and retracting lower vertical rods. A plurality of powered extending and retracting lower vertical rods slidably mounted on vertical rods. A plurality of vertical rods mounted on fixed horizontal rods or the frame and vertical rods mounted on horizontal extending and retracting rods. A plurality of horizontal rods sidably mounted with powered extending or retracting horizontal rods to the fore and aft of the vehicle. A plurality of vertical rods mounted on horizontal extending and retracting rods at the fore and aft of the vehicle wherein the horizontal extending and retracting rods at the fore and aft of the vehicle respectively move their respective independent vertical rods, lower vertical rods and ground contacting modules proximally to the frame or distally away from the frame. Embodiments of this invention are disclosed that implement the extension of horizontal extending and retracting rods for positioning a forward set or an aft set of ground contacting modules to reach over an obstacle or to extend to a stair, whereupon the ground contacting module is thereafter positioned on the distal side of an obstacle or on a stair to provide stability to enable climbing stairs or maneuvering over obstacles, or ascending an inclined surface with the frame remaining stable, and by including a plurality of powered horizontal extending and retracting rods at the fore and aft of the vehicle. In embodiments the vehicle 10 includes carrying a frame 20, platform 30, seat 40, at least one motor (50), power supply (not shown), controller for steering, receiving directional input, responding to commands of a user and generating signals to actuate the motor(s), a processor (not shown) and ground contacting members.

In a basic configuration, the vehicle includes a plurality of vertical rods 110, 112, 120, 122, 130, 132, 140 and 142 having a plane perpendicular to the plane of movement, each connected to a separate plurality of respective horizontal rods 115, 125, 135, 145, or horizontal extending and retracting rods 715, 725, 735, 745, 815, 825 (not shown) 835, and 845. As shown in FIG. 1, transverse rods 650, 660 (not shown), 670 and 680 are coupled to vertical rods 120, 122, 130 and 132 respectively. In some embodiments, at least one transverse rod is coupled to horizontal rods 115, 125, 135 and 145. In preferred embodiments a plurality of vertical rods 110, 112, 120, 122, 130, 132, 140 and 142 are also coupled to their respective extending and retracting lower vertical rods 210, 212, 220 (not shown), 222 (not shown), 232, 240 (not shown) and 242 that enable such lower vertical rods to extend and retract in response to a control signal. Also in preferred embodiments, a plurality of horizontal rods 115, 125, 135, and 145 are coupled to horizontal extension rods 715, 725, 735, 745, 815, 825 (not shown), 835 and 845 that enable such horizontal extension rods to extend and retract. In an embodiment extending and retracting horizontal rods also extend and retract to lengthen or shorten the overall length of the vehicle fore to aft. Additionally, in an embodiment, rods may extend or retract including by telescoping. In an embodiment, rods may be telescoping rods, that is, concentric tubes or the like, having sections that slide one inside the other (not shown) to shorten or lengthen the rod. The invention may be implemented in a wide range of embodiments. In many of the embodiments, a characteristic of the vertical rods is that such vertical rods can be retracted so that some of the ground-contacting members are lifted off the ground or other surfaces such as a floor or road, while other ground contracting members remain on the ground to support the vehicle and maintain its stability. In other embodiments, a characteristic of such extending and retracting vertical rods which have ground contracting members resting on the ground or other surface such as a floor can extend to lift the entire frame of the vehicle higher off the ground. In embodiments, a characteristic of the horizontal rods is to extend to the fore and aft of the vehicle to extend the first set of vertical rods to the fore of vehicle 10 forward or extend the last set of the vertical rods to the aft of the vehicle backwards. Horizontal rods can be extended out or retracted back to assist in climbing stairs or maneuvering over obstacles, or to keep the frame and platform of vehicle 10 level while ascending or descending a steep grade, or to make the total length of the vehicle front-to-back longer or shorter. In some embodiments, extending and retracting rods are telescoping. Also, in embodiments, horizontal and vertical extending and retracting rods are independent and individually controlled. The ground or floor refers to surfaces over which the vehicle in accordance with the invention is maneuvered and may generally be referred to as "ground", "floor", "surface" or "road". In embodiments, the extending and retracting lower vertical rods, the extending and retracting horizontal rods and the ground contacting members are all motor driven. Different style motors may be used. In one embodiment, each rod is associated with at least one motor 50. In alternative embodiments, at least one motor (50) may serve to drive one or more rods to extend or retract said rods. In the embodiments, the vehicle maintains stability by resting on at least four ground contacting members and by extending or contracting lower vertical rods to raise or lower the vehicle to maintain stability. In the embodiments the ground contacting members 310, 312, 320, 322, 330 (not shown), 332, 340 (not shown) and 342 of each extending and retracting lower vertical rod 210, 212, 220 (not shown), 222, 230 (not shown), 232, 240 (not shown) and 242 are capable of being motor-driven independently of each other. Similarly, in embodiments, each of the ground contacting members is capable of being motor driven by a single or a multiplicity of motors. In an embodiment, a motor 50 may drive extending and retracting rods and also cause propulsion of the ground contacting members through interconnected drive train or shaft. A multiplicity of motors may receive electronic signals to actuate the motors. Thus as described, the number of extending and retracting vertical rods may be eight while in other embodiments the vehicle may have fewer or greater rather than eight extending, retracting or telescoping vertical rods, each with its respective ground contacting member. Also as described, the number of extending and retracting horizontal rods may be eight while in other embodiments the vehicle may have fewer or greater than eight extending, retracting or telescoping horizontal rods. Additionally, as described, the number of extending and retracting transverse rods may be four, while in other embodiments the vehicle 10 may have fewer or greater than four extending, retracting or telescoping transverse rods. In this regard, the vehicles, methods, and systems of the disclosed invention may be used by a variety of users and are suited for assistive technologies.

Upon reaching an obstacle, impediment or stairs the controller operated manually or by computer, on-board or remotely, causes the lower vertical rods to lift the first set of ground contacting members 110 and 112 upwardly and extend those ground contacting modules to the fore of the vehicle to begin the process of moving over an obstacle or climbing stairs without having to tilt the frame of the vehicle.

Referring to FIG. 1, vehicle 10 includes a frame 20 for carrying a platform 30 upon which a person, a robot or cargo may be supported. Vehicle 10 is capable of moving forwards, backwards or sideways. Fore and aft are defined by vehicle 10 moving in a forward motion or in a backwards motion respectively.

The platform 30 may include a seat 40 for a person to sit on while being transported by the vehicle 10. In embodiments, either a person or cargo may rest upon the platform 30 behind seat 40. In embodiments, the platform may be solid, while in other embodiments, the platform may be collapsible or removable. The vehicle includes at least one motor (50) or engines (not shown) capable of extending and retracting the lower vertical rods, the extending and retracting horizontal rods and also capable of running the ground contacting modules to move the vehicle in a desired direction. Moving the vehicle on a surface or over an obstacle or in climbing stairs can be accomplished by each of the ground contacting modules operating independently, but controlled by at least one control source. One or more axles with wheels are fixed to each ground contacting module. Vehicle 10 is coupled to an on board computer (not shown) that sends and receives information signals. A controller (not shown) performs the functions of directing and navigating the vehicle and may respond to commands of a user for such input such as directional input. Vehicle 10 is also provided with a power source, which in the alternative may be electric, batteries, gasoline, hydrogen, fuel cells, compressed air or the like. On board circuitry enables the controller to control the motors, interact with the computer, send and receive signals, drive the vehicle and navigate in the desired manner to accomplish that the vehicle functions as a transportation device as described herein Laser and radar guidance systems and the like as well as video cameras and sensors, detector (not shown) send and receive signals, assist in navigating over surfaces and obstacles and in climbing stairs. Sensors by way of illustration and not limitation may include those to measure, speed the vehicle is traveling, height of the frame, distance extending and retracting rods are extended or retracted, the height, width and depth of an obstacle, the number of stairs, the distance of the frame, ground contacting modules and rods from the stairs, the height of the stairs, the height of the riser of each stair, the surface area of each stair, the width of each stair, how level the frame is, operation of each motor, operation of each brake (not shown) and the like.

In various embodiments, a control program running on at least one processor determines and calculates appropriate commands to the motors and sensors.

The vehicle of one embodiment includes:

Eight ground contacting modules 310, 312, 320, 322, 330, 332, 340 and 342, where all or some of the ground contacting modules are capable of contacting and moving over an underlying surface, each mounted at the base of its own respective vertical extending and retracting lower vertical rod (ground contacting modules and ground contacting members are used interchangeably). Ground contacting modules are capable of moving the vehicle in a desired direction. Ground contacting module 310 is coupled to lower vertical rod 210. Ground contacting module 312 is coupled to lower vertical rod 212. Ground contacting module 320 is coupled to lower vertical rod 220. Ground contacting module 322 is coupled to lower vertical rod 222. Ground contacting module 330 is coupled to lower vertical rod 230. Ground contacting module 332 is coupled to lower vertical rod 232. Ground contacting module 340 is coupled to lower vertical rod 240. Ground contacting module 342 is coupled to lower vertical rod 242;

Eight lower vertical rods 210, 212, 220, 222, 230, 232, 240 and 242 that extend and retract from and are coupled to vertical rods 110, 112, 120, 122, 130, 132, 140 and 142 respectively. The bidirectional moving lower vertical rods perform the function of raising a ground contacting module when a lower vertical rod is retracted, lowering a ground contacting module when the lower vertical rod is extended or raising the frame which enables the platform to be raised higher off the ground, or lowering the frame by retracting all or most of the lower vertical rods to accomplish positioning the entire vehicle closer to the ground. Such elevating or lowering of the vehicle provides the vehicle with the capabilities to move over obstacles, climb stairs and to also accomplish a lower center of gravity for moving more rapidly over level surfaces. The lower vertical rods are driven by at least one motor.

Eight substantially vertical and rigid vertical rods 110, 112, 120, 122, 130, 132, 140 and 142 capable of supporting frame 20, platform 30 and riders or a payload, that may be arrayed fore to aft in two approximately parallel lines of four vertical rods each, where rods 110, 120, 130 and 140 are substantially in a line arrayed fore to aft and where rods 112, 122, 132 and 142 are also substantially in a line arrayed fore to aft. Vertical rods 110 and 112 are mounted to the fore on horizontal extending and retracting rods 715, 725, 735, and 745, while vertical rods 120, 122 130 and 132 are mounted on the frame or fixed horizontal rods 115, 125, 135, and 145, and vertical rods 140 and 142 are mounted to the aft on horizontal extending and retracting rods 815, 825, 835 and 845;

Four horizontal rods 115, 125, 135 and 145 positioned such that the front of such horizontal rods is to the fore and that back of such horizontal rods is to the aft Four extending and retracting horizontal extension rods 715, 725, 735, and 745 located to the fore of vehicle 10 such that horizontal extension rod 715 is coupled to horizontal rod 115, horizontal extension rod 725 is coupled to horizontal rod 125, horizontal extension rod 735 is coupled to horizontal rod 135 and horizontal extension rod 745 is coupled to horizontal rod 145. The horizontal extension rods are driven by at least one motor and can individually extend forwards in a fore-aft plane from each respective horizontal rod to the fore of the vehicle or is capable of retracting back toward the aft of the vehicle.

Four extending and retracting horizontal extension rods 815, 825, 835, and 845 located to the aft of vehicle 10 such that horizontal extension rod 815 is coupled to horizontal rod 115, horizontal extension rod 825 is coupled to horizontal rod 125, horizontal extension rod 835 is coupled to horizontal rod 135 and horizontal extension rod 845 is coupled to horizontal rod 145 as illustrated in FIG. 1. The horizontal extension rods are driven by at least one motor and each can be individually extended from its respective horizontal rod to the aft of the vehicle or is capable of retracting back toward the front of the vehicle.

Vertical rod 110 is fixed to horizontal extension rods 715 and 725 and vertical rod 112 is fixed to horizontal extension rods 735 and 745.

Vertical rod 120 is fixed to horizontal rods 115 and 125 toward the fore of the vehicle and vertical rod 122 is fixed to horizontal rods 135 and 145 toward the fore of the vehicle.

Vertical rod 130 is fixed to horizontal rods 115 and 125 toward the aft of the vehicle and vertical rod 132 is fixed to horizontal rods 135 and 145 toward the aft of the vehicle.

Vertical rod 140 is fixed to horizontal rods 815 and 825 and vertical rod 142 is fixed to horizontal extension rods 835 and 845.

Transverse horizontal rod 650 running from side to side is fixed to horizontal rods 115 and 135 to the fore of vehicle 10; transverse horizontal rod 660 (not shown) running from side to side is fixed to horizontal rods 125 and 145 to the fore of the vehicle; transverse horizontal rod 670 (not shown) running from side to side is fixed to horizontal rods 115 and 135 to the aft of the vehicle; and transverse horizontal rod 680 (not shown) running from side to side is fixed to horizontal rods 125 and 145 to the aft of vehicle 10. In alternative embodiments, transverse horizontal rods 650, 660, 670, and 680 are attached to vertical rods 120, 122, 130 and 132 (not shown).

Frame 20 is formed by vertical rods 120, 122, 130, and 132, horizontal rods 115, 125, 135 and 145 and transverse rods 650, 660, 670, and 680.

Platform 30 rests upon horizontal rods 125 and 145 and upon transverse rods 660 and 680 and can support a payload that can include one or more persons sitting or standing, a robot or cargo. In one embodiment, the platform extends to the aft of the seat providing standing room for a rider or cargo space. The platform 30 is fixed to the underside of the frame 20 and may serve as a foot rest. In other embodiments, the platform may be movable or collapsible.

Seat 40 rests upon platform 30 and is movably mounted on platform 30 to provide seating.

A power source (not shown) is secured to the platform so that the vehicle can run under its own power. The power supply is connected to the motor(s), the controller and the computer. In a preferred embodiment, the preferred power supply is rechargeable batteries.

At least one motor 50 drive(s) the wheels of each of the ground contacting modules. There may be redundant motors. At least one motor 50 also drives the lower vertical rods, and horizontal extension rods. In a preferred embodiment, each ground contacting module is coupled to its respective motor 50. In an alternative embodiment at least one motor 50 fixed to the platform controls the ground control modules and the extending and retracting rods.

Variety of sensors without limitation, including sensors for measuring the number stairs, height of stairs, height of each riser, surface of each stair, distance of vehicle from stairs, the extension of each lower vertical rod, extension of horizontal, extension rods, pitch and for sending sensor signals to the processor.

At least one processor to provide information to the controller and to the user, and to generate signals to motor(s)

and for receiving input, informational signals and feedback from the sensors and the user and in embodiment for running at least one program.

In various embodiments a control program running on a processor determines and calculates the appropriate command to send motors. Control program performs an initialization procedure check for rider commands System for signal communications for transmitting signals upon electrical conductors, optical and infrared, and by wireless.

Brakes (not shown)

In one embodiment, a motorized drive system (not shown) includes rotating shafts inside the rods powered by at least one motor.

At least one controller for directional input (not shown)

One or more of the lower vertical rods 210, 212, 220, 222, 230, 232, 240 and 242 that extend and retract can be individually retracted such that the desired ground contacting modules can be lifted off of the underlying surface, while the other ground contacting modules remain on the underlying surface and the vehicle remains stable;

A set of lower vertical rods extending and retracting rods such as 210 and 212 can be individually lifted such that the ground contacting modules 310 and 312 are lifted off of the surface upon which the vehicle rests. Similarly other lower vertical rods such as 220 and 222, 230 and 232 and 240 and 242 may also be individually retracted to lift their respective ground contacting modules off the ground or individually extended to make contact with the ground. Horizontal extension rods 715, 725, 735 and 745 individually extend such that the ground modules 310 and 312 connected to the first set of lower vertical rods 210 and 212 are thereby extended to the fore of vehicle 10 over an obstacle or upon a stair and then the lower vertical extending and retracting rods 210 and 212 are then extended in a downward direction causing the ground modules 310 and 312 of each of the first set lower vertical extending and retracting rods 210 and 212 to make contact with the surface on the other side of the obstacle or upon a stair.

When the horizontal extending and retracting rods are extended forward from vehicle 10, the ground contacting modules 310 and 312 are extended to the distal side of an obstacle and lowered to the surface on the distal side of an obstacle or upon a stair, such ground contacting modules act to provide stability along with ground control modules 340 and 342 for the vehicle such that lower vertical rods 220, 222 230 and 232 and their respective ground contacting modules 320, 322, 330 and 332 can be lifted off of the ground while the vehicle is propelled forward or backward or in any direction desired over an underlying surface or over an obstacle or in an ascent or descent. Horizontal extension rods 715, 725, 735, 745, 815, 825, 835 and 845 extend or retract to bring vertical rods 110, 112, 140 and 142 respectively, lower vertical rods 210, 212, 240 and 242 respectively and ground contacting modules 310, 312, 340 and 342 respectively closer to or farther from frame 20.

In a related embodiment a multiplicity of extending and retracting vertical rods extend downward to lift frame 20 of vehicle 10 higher. For ascending stairs, the frame can be lifted to a height somewhat higher than the level of the surface of the stair upon which ground control modules 310 and 312 are intended to be placed, or to lift the vehicle over an obstacle on the underlying surface, causing the vehicle to remain stable.

In a related embodiment, the ground contacting modules include in different embodiments, wheels, tracks, treads, wheel clusters, rollers, rollerballs, uniballs, skis, belts, magnets for magnetic levitation, rockets and the like as well as brakes (not shown) that can be mounted thereon.

A motorized drive arrangement (not shown) coupled to the ground contacting modules to propel the user in the desired direction and to power the extending and retracting rods to individually extend or retract. In an embodiment, a power driven arrangement may be included inside of hollow shafts of the vertical and horizontal rods. In an embodiment, such motors are actuated by a controller either on board or communicating wirelessly and directly controlled by a person, or controlled by a computer that may in alternative embodiments be on board or communicating wirelessly with the vehicle.

Another embodiment of the vehicle and method disclosed herein utilizes a multiplicity of extending or retracting, telescoping and non-telescoping rods. For example only, the horizontal rods between the second set of vertical rods and third set of vertical rods may in alternative embodiments also be coupled to extending rods 615, 625, 635, and 645 respectively. Also the transverse rods may in embodiments be coupled to extending and retracting rods 655, or 665, 675 and 685 (not shown) to increase or decrease the width of the vehicle. Alternative embodiments with the horizontal rods extended forward to the fore of the vehicle or backwards to the rear of the vehicle are actuated by a person on board or remotely by wireless communication or by the computer.

In a related embodiment, there are provided a multiplicity of motorized drive arrangements (not shown) coupled to each of the ground contact modules to drive the vehicles and to power the extending and retracting rods to lift or lower the ground contact modules and also to power the entire vehicle and its payload over obstacles or to ascend or descend stairs, and to extend and retract from or towards frame 20 or to make the vehicle 10 longer or shorter front to back. The extension and retraction of horizontal rods and vertical rods are actuated by a person or computer in different embodiments either on the vehicle or by remote communication.

In another related embodiment, horizontal extension rods 715, 725, 735, 745, 815, 825, 835 and 845 can swivel, flex or bend on the horizontal axis permitting the horizontal extension rods to improve the turning capability of the vehicle.

In a related embodiment, the vehicle has at least one on-board computer (not shown).

In a related embodiment, the vehicle is also comprised of control mechanism for operation by the user, by an on board computer or by wireless or remote control.

In a related embodiment, the extending, retracting, or telescoping rods are electric, pneumatic, or hydraulic.

In a related embodiment the motorized drive arrangements and vertical telescoping rods coupled to the ground contacting module and payload constituting a system; the motorized drive arrangement causing, when powered, the system to remain stable by extending or retracting the vertical telescoping rods to balance the vehicle to keep the vehicle stable and from tipping either fore-aft or side to side.

In some embodiments, the platform that supports the user and is mounted on the frame may be movable front to back so as to shift the center of gravity forwards or backwards, or may be suspended in a manner to permit the platform to tilt, swivel or rotate. The platform may telescope to be extended or may be retracted fore to aft (not shown) to provide more room for a user to stand upon the platform.

Further, some approaches may be capable of communicating with other computing devices, software programs, and the Internet. Additionally, some embodiments may have sensors, video cameras, laser or radar devices (not shown)

for measuring and assisting in the guidance of vehicle. In an embodiment, proximity sensors, in communication with a processor determine the presence and dimensions of an obstacle or stairs or measure the obstacle or stairs to traversed In some embodiments, the ground contacting modules each contain a motor 50 for propelling vehicle 10 as well as for extending or retracting the respective lower vertical rod. In these embodiments a motor secured to platform 30 turns shafts inside vertical or horizontal rods to propel the vehicle or to extend or retract vertical or horizontal rods.

Different numbers and sequences of lower vertical rods and their respective ground contacting modules may be advantageously used for different embodiments of the invention. Electrically, pneumatically or hydraulically operable extensible or retractable telescoping vertical rods and telescoping horizontal rods extend or retract such rods in a manner that is desirable for operating the vehicle on flat surfaces or terrain, sloping terrain, over an obstacle or ascending or descending stairs.

At least one power source (not shown) such as a battery or fuel cells supplies the power for the various motors and controls later described, controls (not shown), one or more motors 50, an onboard computer (not shown) and video cameras, radar, sensors, laser guidance (not shown) assist in the controls, guidance, propulsion, maneuvering and locomotion of the vehicle. At least one motor 50 is connected to a power source (not shown). In an alternative embodiment, a leveling device (not shown) can assist in keeping the vehicle level and stable by controlling the extension or retraction of the telescoping vertical rods.

A vehicle in accordance with one embodiment of the invention is self-propelled.

Figure 3:
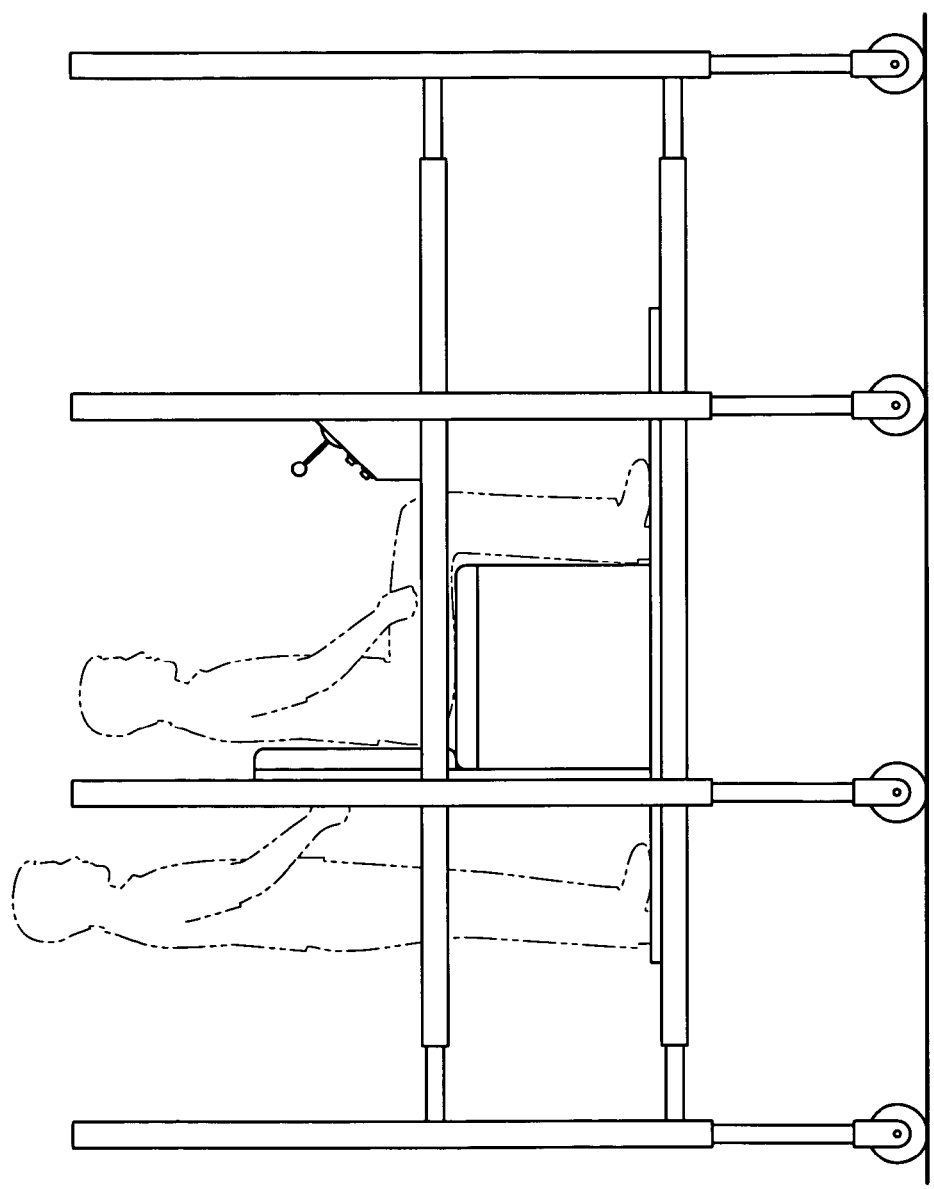
FIG. 3 is a side view of the vehicle in accordance with the present invention with one person sitting and another standing in the back of the vehicle.
Figure 4:
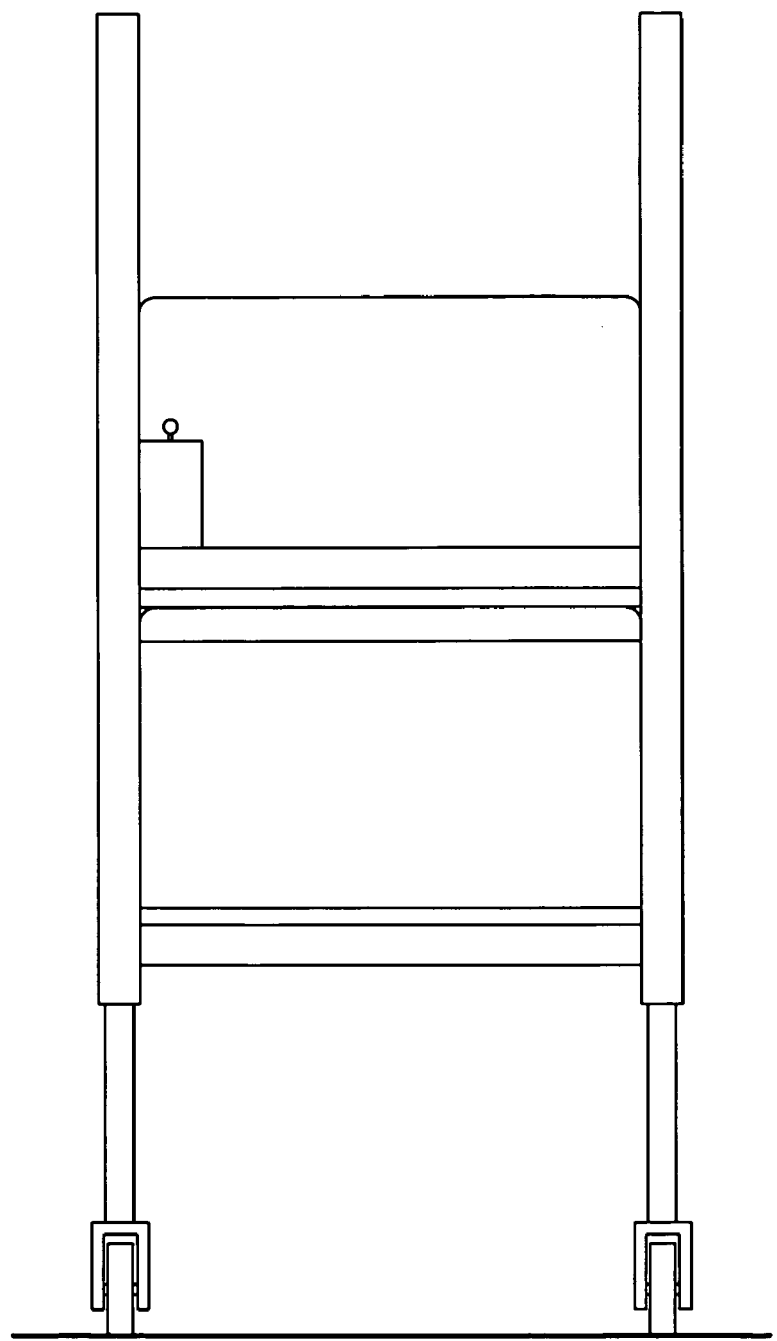
FIG. 4 is a front elevation of the vehicle.

As shown in FIG. 3, vehicle 10 in accordance with one embodiment of the invention is controlled by a person operating a controller provided so that a person can control the motors from either a sitting position or a standing position.

The vehicle in accordance with one embodiment of the invention is controlled by the on-board computer communicating with the sensors, video cameras, laser guidance, radar system and one or more motors.

The vehicle in accordance with one embodiment of the invention has an on-board computer that can interface with sensors or video cameras that provide information to the computer for measuring stairs or obstacles so that the on-board computer can maneuver the vehicle.

The vehicle in accordance with one embodiment of the invention is controlled remotely and can send and receive signals and information through wireless and bussing means.

FIG. 1 shows the vehicle on level ground in a mode to travel. All ground contacting modules are in contact with the ground. The vehicle can travel in a forward or backward direction or in a side to side direction in a speed and direction desirable to the user and controlled by the controller or remotely.

FIG. 3 shows the vehicle balanced with all ground contacting modules in contact with the ground, the telescoping vertical rods extended upwards and with the frame and platform positioned off the ground. Frame 20 of vehicle 10 can be lifted off the ground by extending the lower vertical rods or can be lowered towards the surface by retracting lower vertical rods. Also referring to FIG. 3, one user is shown sitting on the seat 40, while another user is shown standing behind the seat on platform 30.

Figure 5:
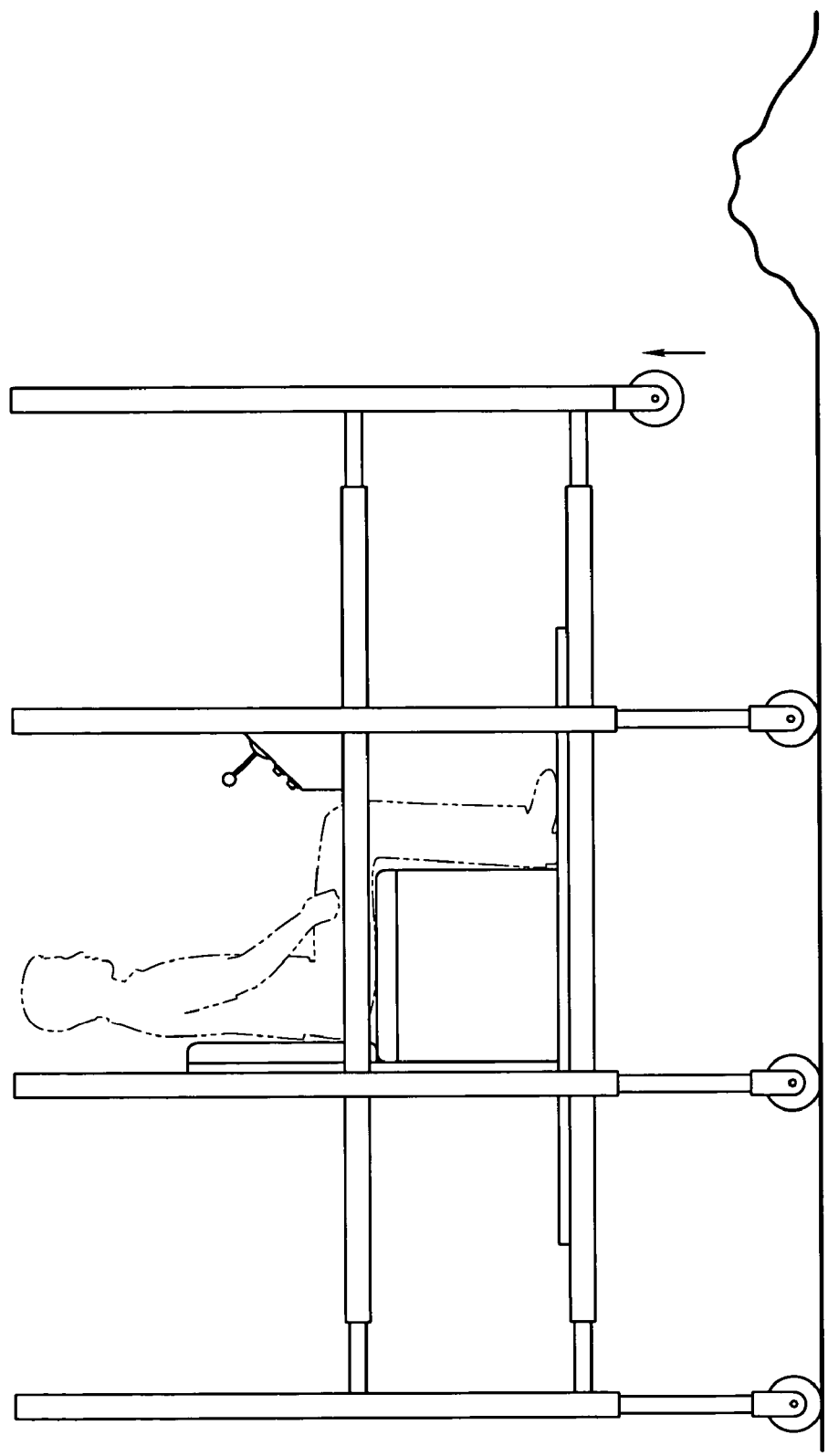
FIG. 5 illustrates the first two lower vertical rods to the fore of the vehicle retracted in a manner that their respective ground contacting modules are suspended above the surface while the vehicle rests upon the other ground control modules.

FIG. 5 shows vehicle 10 approaching an obstacle on the underlying surface balanced with six ground contacting modules in contact with the ground, the frame of the vehicle 10 sufficiently elevated off the surface to permit frame 20 and the ground contact modules of vehicle 10 to pass over an obstacle and the lower vertical rods 210 and 212 retracted upwards in a vertical axis with ground contacting modules 310 and 312 at a height that is higher than the obstacle. It can be seen that by extending the lower vertical rods to raise the frame off the surface, vehicle 10 can travel over obstacles without any of its ground contacting modules contacting the obstacle.

Figure 6:
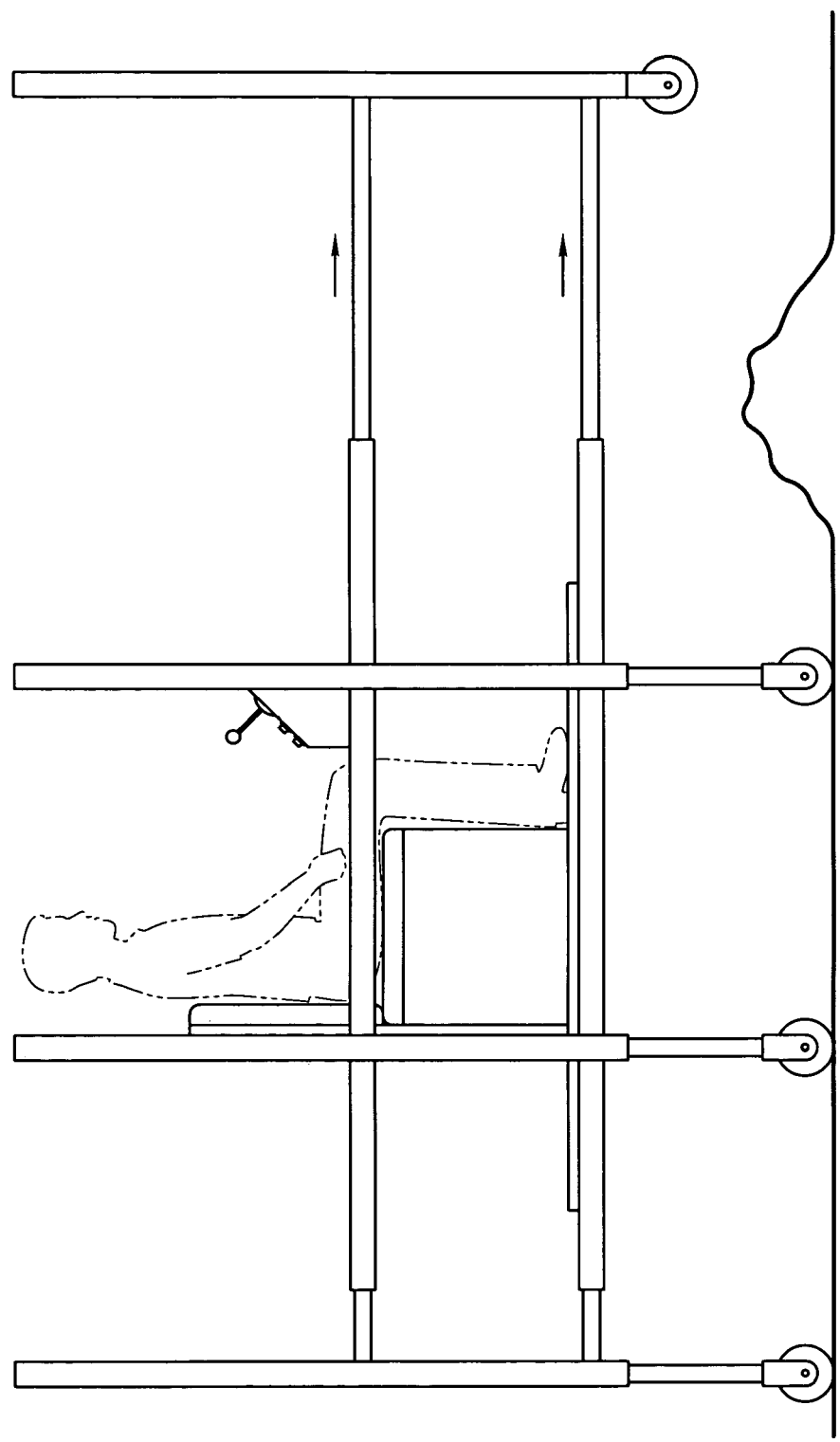
FIG. 6 illustrates the first two lower vertical rods retracted and the horizontal extension rods to the fore of the vehicle extended ahead of the vehicle in a manner to suspend the first two lower vertical rods and their respective ground contacting modules forward past an obstacle, while other ground contacting modules keep the vehicle in a balanced and stable mode as a control strategy for placing the first set of ground control modules over and past an obstacle.

FIG. 6 shows vehicle 10 with the forward telescoping horizontal rods 715 (not shown), 725 (not shown), 735 and 745 extended forwards in a fore-aft axis in a manner to suspend the first two forward lower vertical rods 110 (not shown and 112 with their respective ground contacting modules 310 (not shown) and 312 respectively in a mode to extend forwards on the other side of the obstacle, while other ground contacting modules keep vehicle 10 in a balanced and stable mode to suggest how the invention may be employed to move vehicle 10 over an obstacle.

Figure 7:
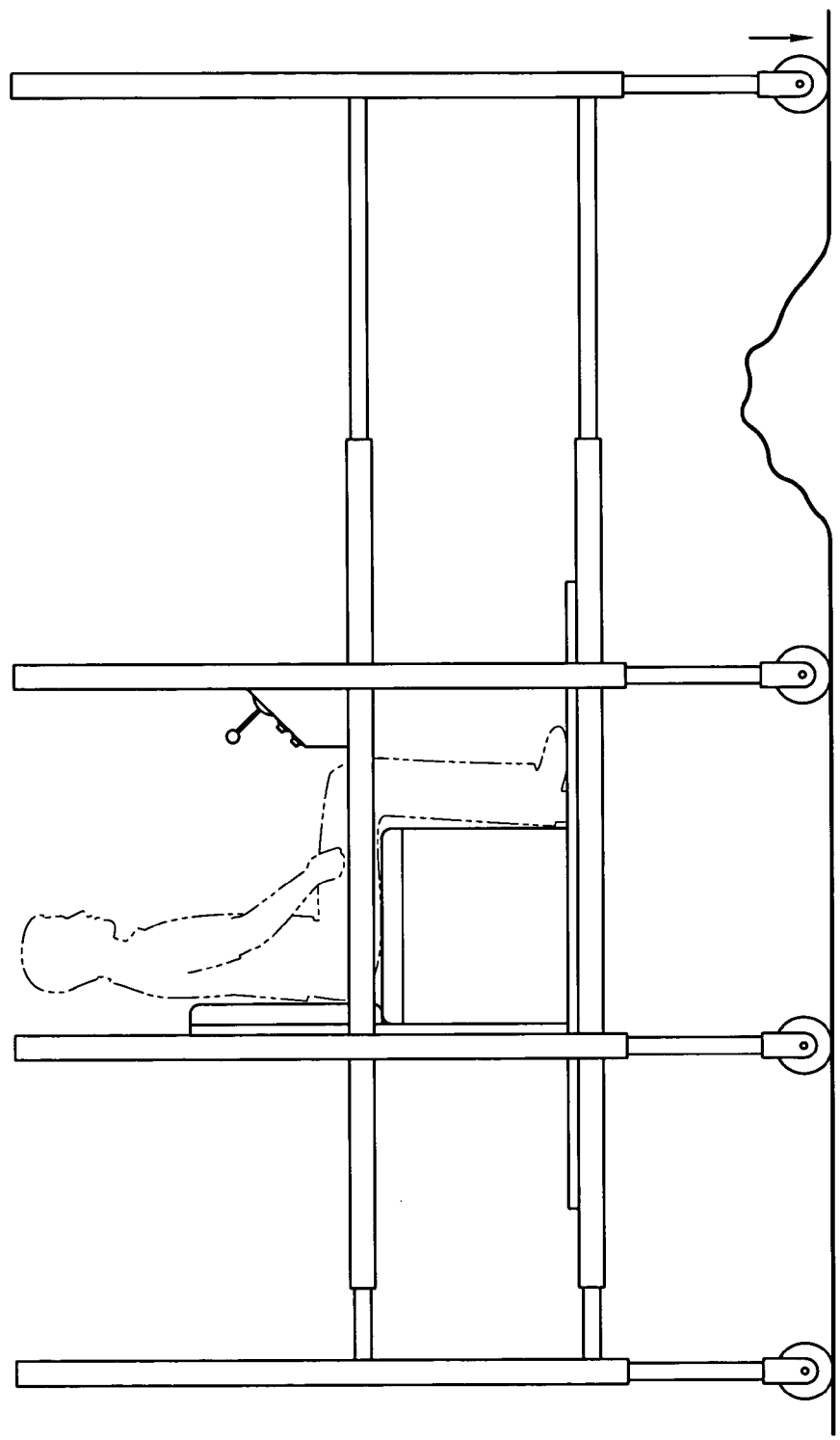
FIG. 7 illustrates the extension of the fore horizontal extending and retracting rods forward away from the frame and the first two ground control modules extended such that their ground control modules are in contact with the surface on the distal side of an obstacle, while the other six ground control modules remain on the surface on the other side of the obstacle.
Figure 8:
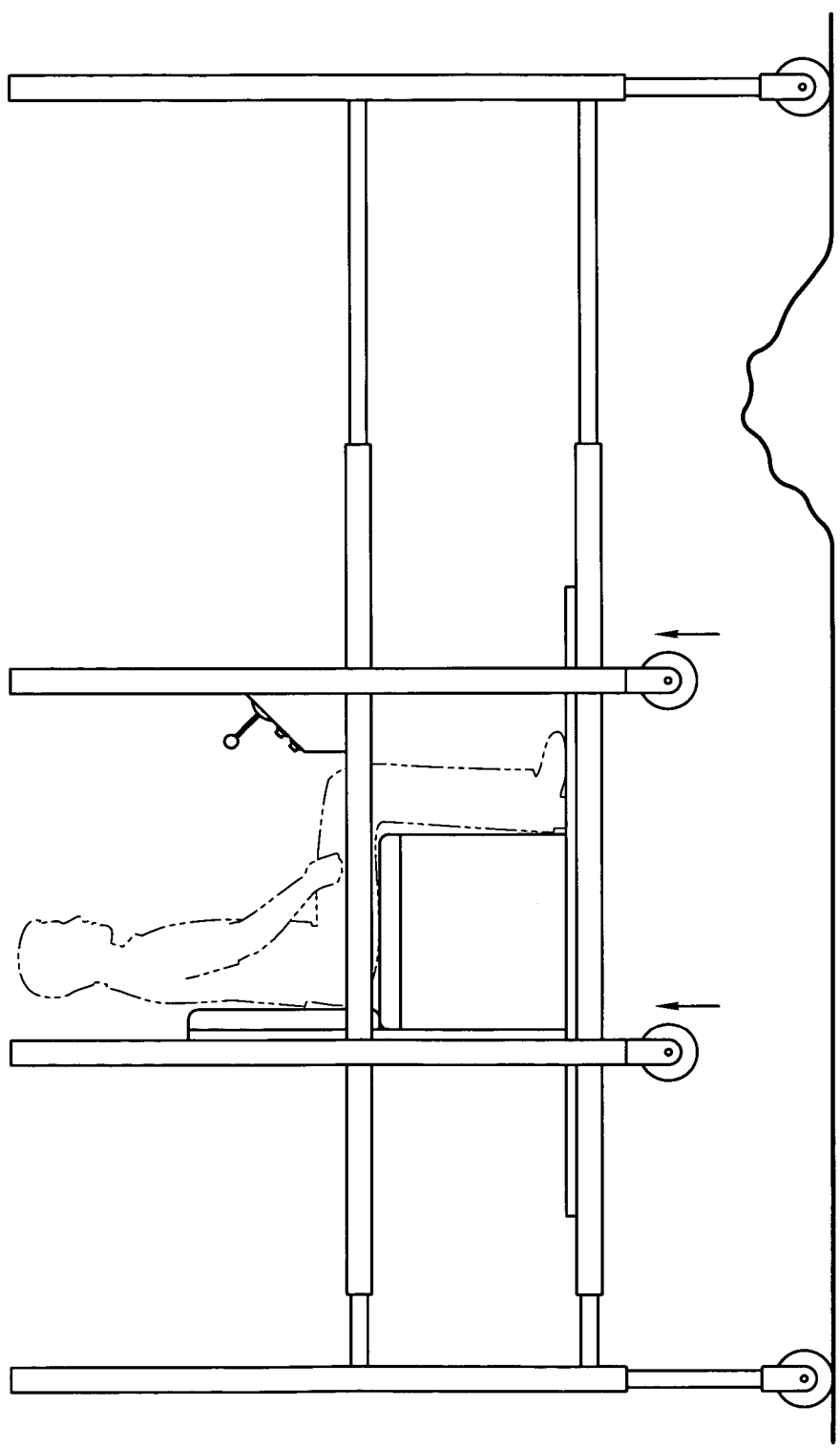
FIG. 8 illustrates the horizontal extending and retracting rods extended forward to position the first set of ground contacting modules to the fore of the vehicle on the distal side of an obstacle and the fourth set of ground contacting modules on the surface supporting the vehicle, while the second set of ground contacting modules and third set of ground contacting modules are retracted to a height above the obstacle to permit the vehicle to pass over the obstacle.
Figure 9:
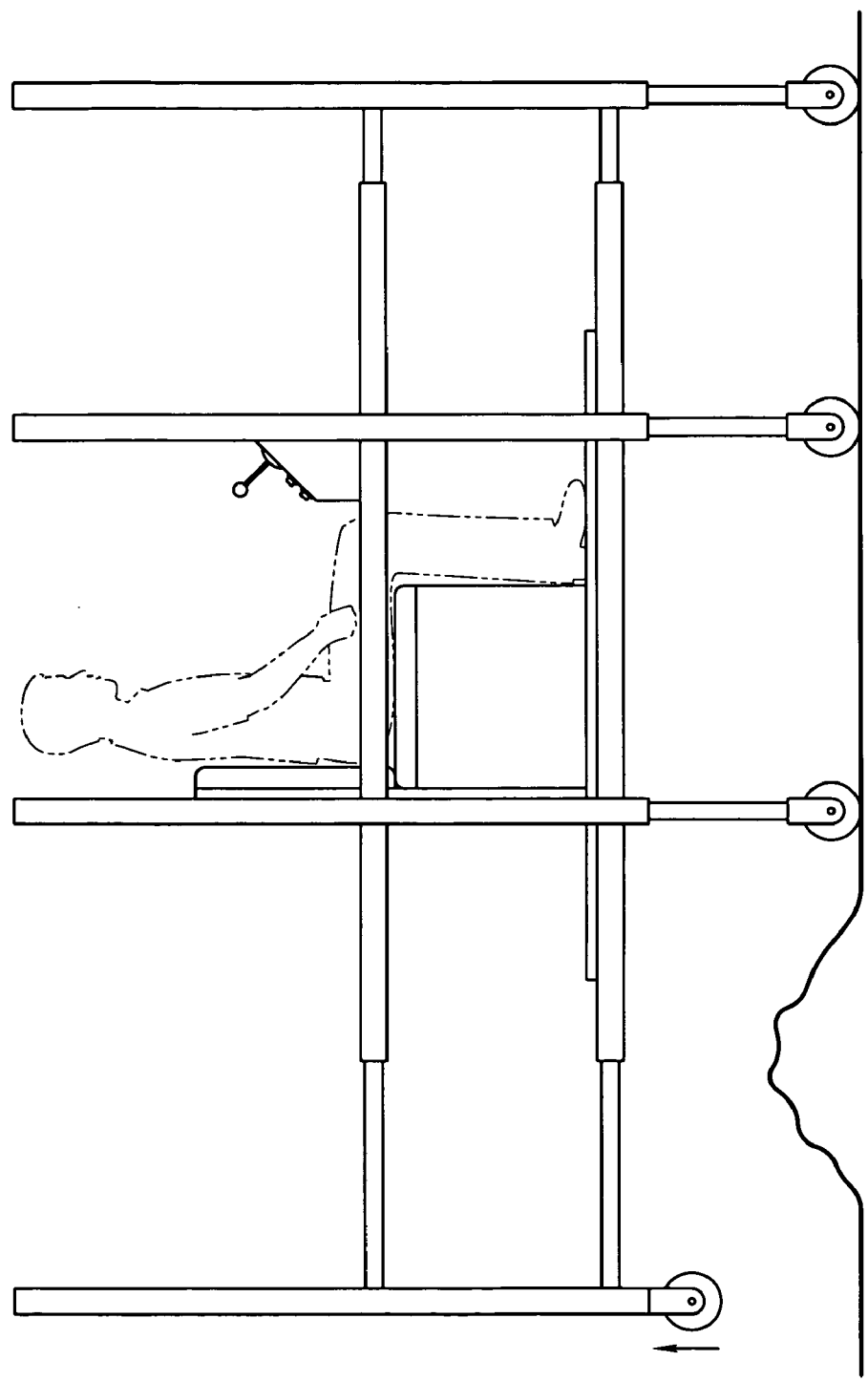
FIG. 9 is a view of the first three sets of ground contacting modules having passed the obstacle, the extending and retracting horizontal rods at the aft of the vehicle are extended outward away from the vehicle such that the fourth set of ground contacting modules is on the distal side of the obstacle as the fourth set of ground contacting members mounted on their respective lower vertical rods is retracted upwards to permit the vehicle to pass over the obstacle.

FIGS. 7-9 show how the vehicle moves forward and remains stable while the vehicle maneuvers over an obstacle on an underlying surface. It can be seen that contact modules is raised by retracting their respective lower vertical rods to pass over an obstacle and upon passing the obstacle by vehicle 10 moving in a direction to negotiate past the obstacle, the ground contacting modules are lowered again to contact the surface. In accordance with the present invention, at least the number of ground contacting modules are in contact with the ground that are required to keep vehicle 10 stable as it travels over an obstacle.

FIGS. 10-23 show vehicle 10 ascends stairs while remaining stable.

Figure 10:
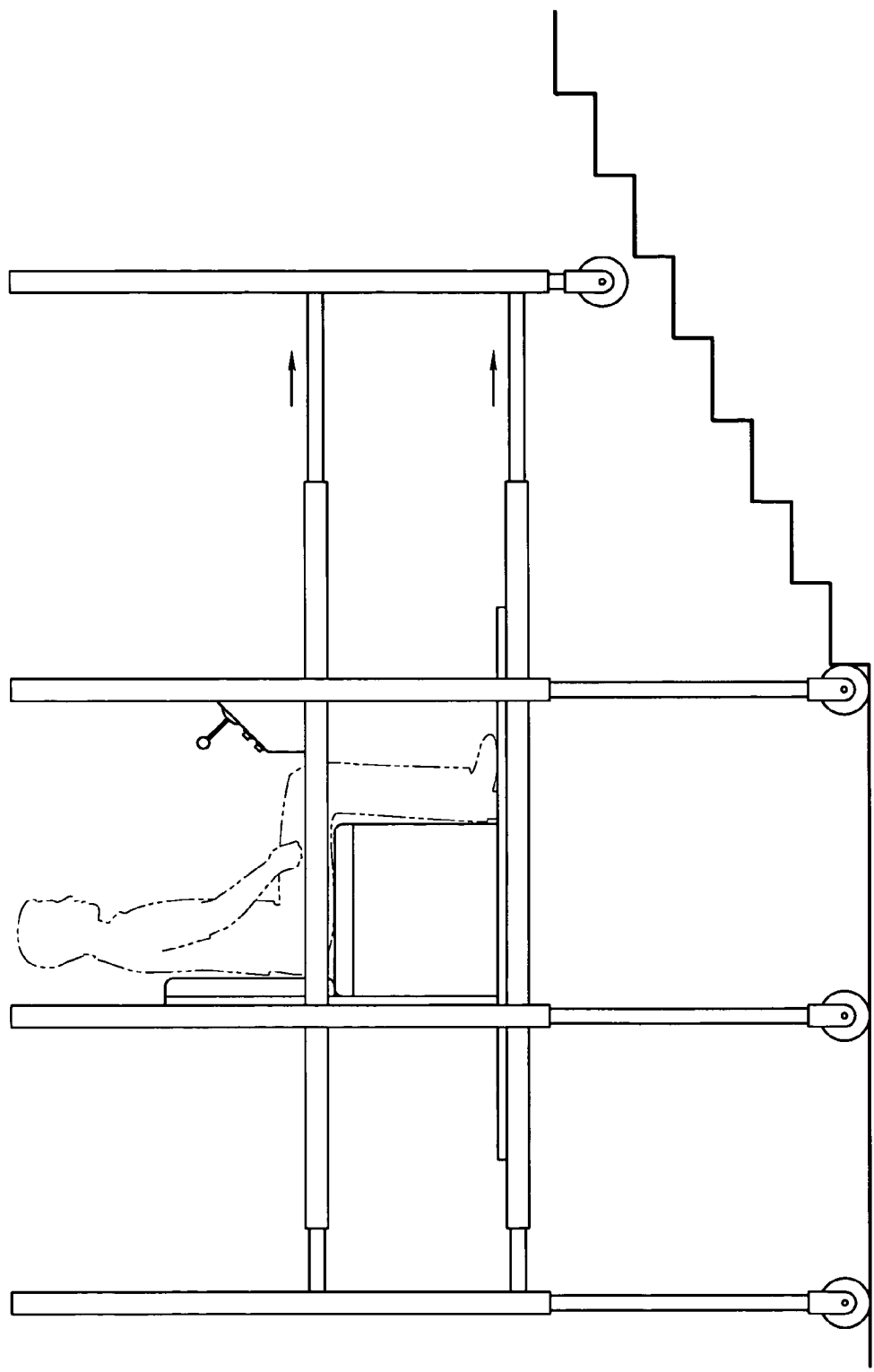
FIG. 10 illustrates the vehicle at a stairway wherein the horizontal extending and retracting rods at the fore of the vehicle are extended forwards to extend to a position over stair five and with the frame raised to a sufficient height off the floor to extend the first set of ground contacting modules to be positioned over stair five.

FIG. 10 shows vehicle 10 positioned at stairs with the lower vertical rods extended to upwardly lift the frame in a manner sufficiently elevated to enable the ground contacting modules 110 (not shown) and 112 to be positioned at an elevation higher than stair five. The vehicle is resting on ground contacting modules 120 (not illustrated), 122, 130 (not illustrated), 132, 140 (not illustrated) and 142. Frame 20 and platform 30 are level. Lower vertical rods 210 and 212 are retracted lifting ground contacting modules 310 (not shown) and 312 upwards. Extending and retracting horizontal rods 715 (not shown), 725 (not shown), 735 and 745 at the fore of the vehicle are extended forwards to position ground contacting modules 310 (not shown) and 312 over a stair that is higher than the first stair.

Figure 11:
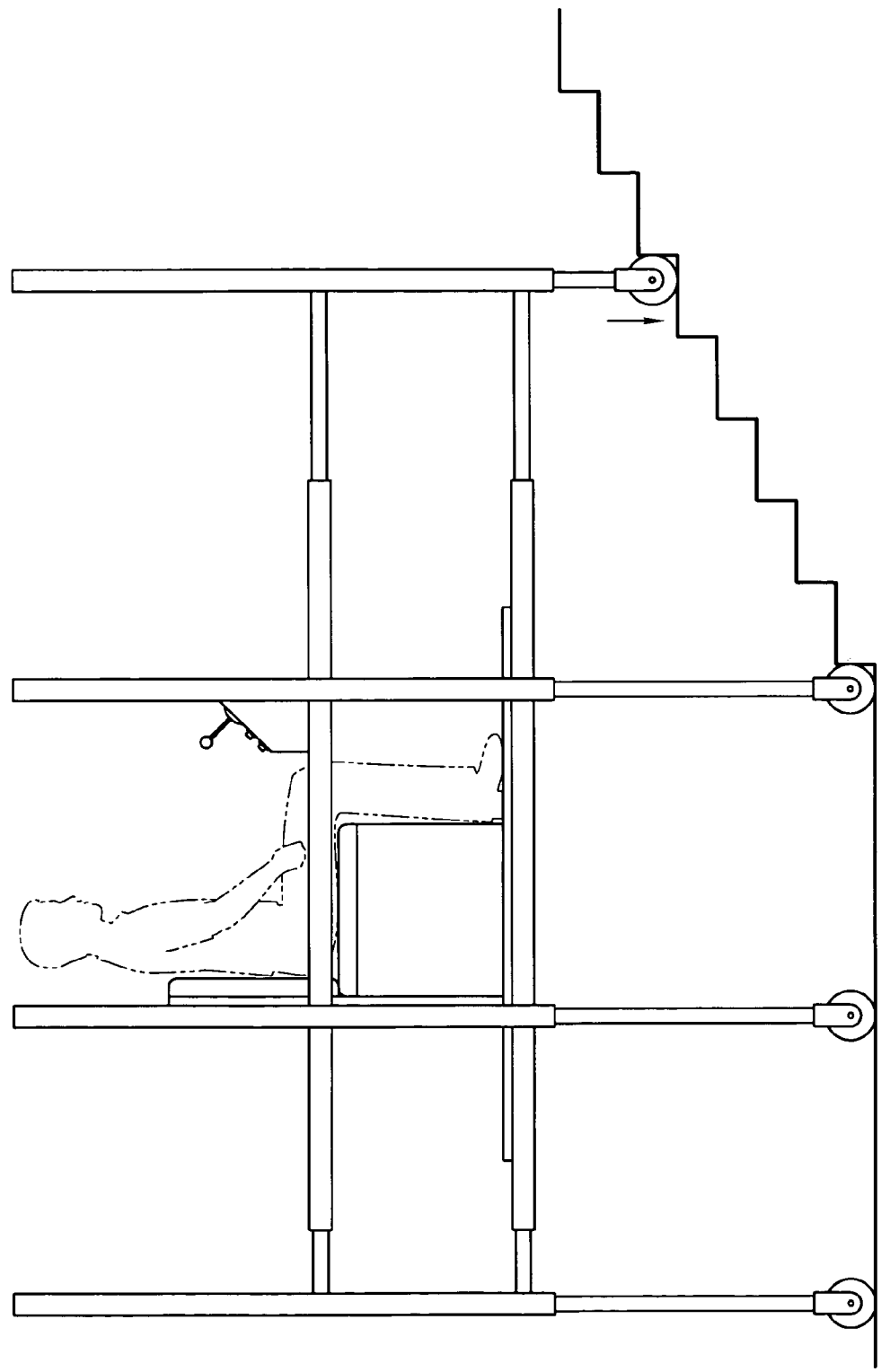
FIG. 11 is a side view of the vehicle showing the first set of ground contacting modules positioned upon a stair and the other ground contracting positioned on a surface such as a floor.

Referring now to FIG. 11, ground contacting modules 310 and 312 are lowered to come in contact with that stair. FIG. 11 also illustrates that ground contacting modules 310 and 312 moving forward until both the first left and first right ground contacting modules come in contact with the riser of such stair. In embodiment this can occur by either extension of the horizontal extending and retracting rods to the fore of the vehicle or by moving vehicle 10 forwards. Also in embodiments, upon coming in contact with the riser, the wheels of ground contacting modules 310 and 312 may lock.

Figure 12:
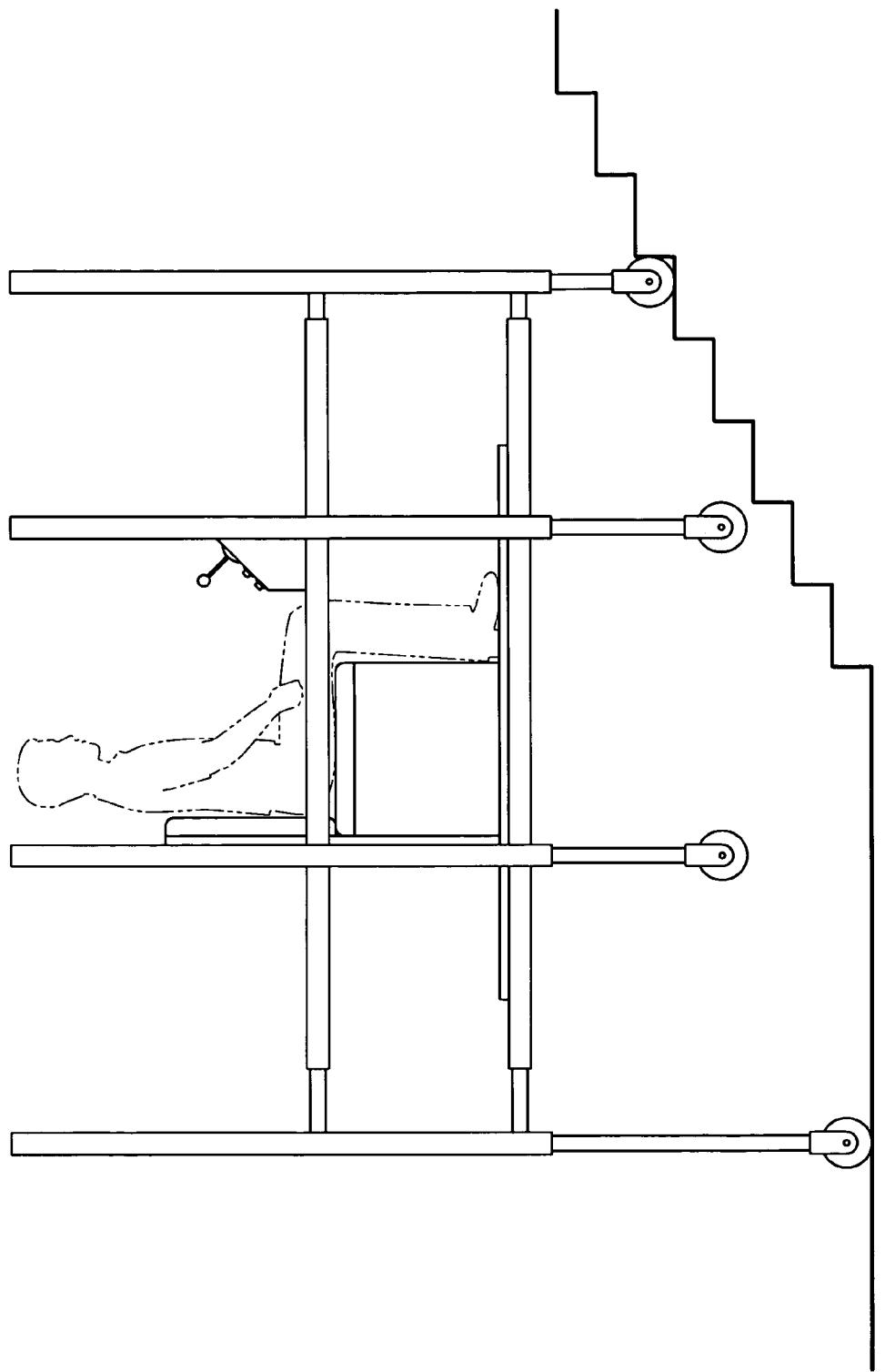
FIG. 12 is a side view of a vehicle in accordance with the invention showing the first set of ground contacting modules to the fore of the vehicle positioned on a stair and the fourth set of ground contacting modules positioned on the surface of a floor, while the second and third set of ground contacting modules are retracted and the second set of ground contacting modules is positioned over a stair as prior to the second set of ground contacting modules are extended to be positioned on the stair and the extending and retracting horizontal rods to the aft of the vehicle are in a retracted mode.

FIG. 12 shows vehicle 10 resting in a stable manner on ground contacting modules 310 (not shown), 312, 340 (not shown) and 342. Lower vertical rods 220, 222, and their respective ground contacting modules 320 and 322 and lower vertical rods 230 and 232 and their respective ground contacting modules 330 and 332 are retracted upwards to lift such ground contacting modules off the floor and to an elevation to permit ground contacting modules 320 and 322 to be positioned higher than the stair upon which such ground contacting modules are intended to be placed. Vehicle 10 moves toward the stairs to position ground contacting modules 320 and 322 over a stair. As the vehicle moves forward, the forward extending and retracting horizontal rods 715, 725, 735 and 745 are retracting as the vehicle approaches the stairs. Ground contacting modules 320 and 322 are placed over a lower stair than the stair upon which ground contacting modules 310 and 312 are resting.

Figure 13:
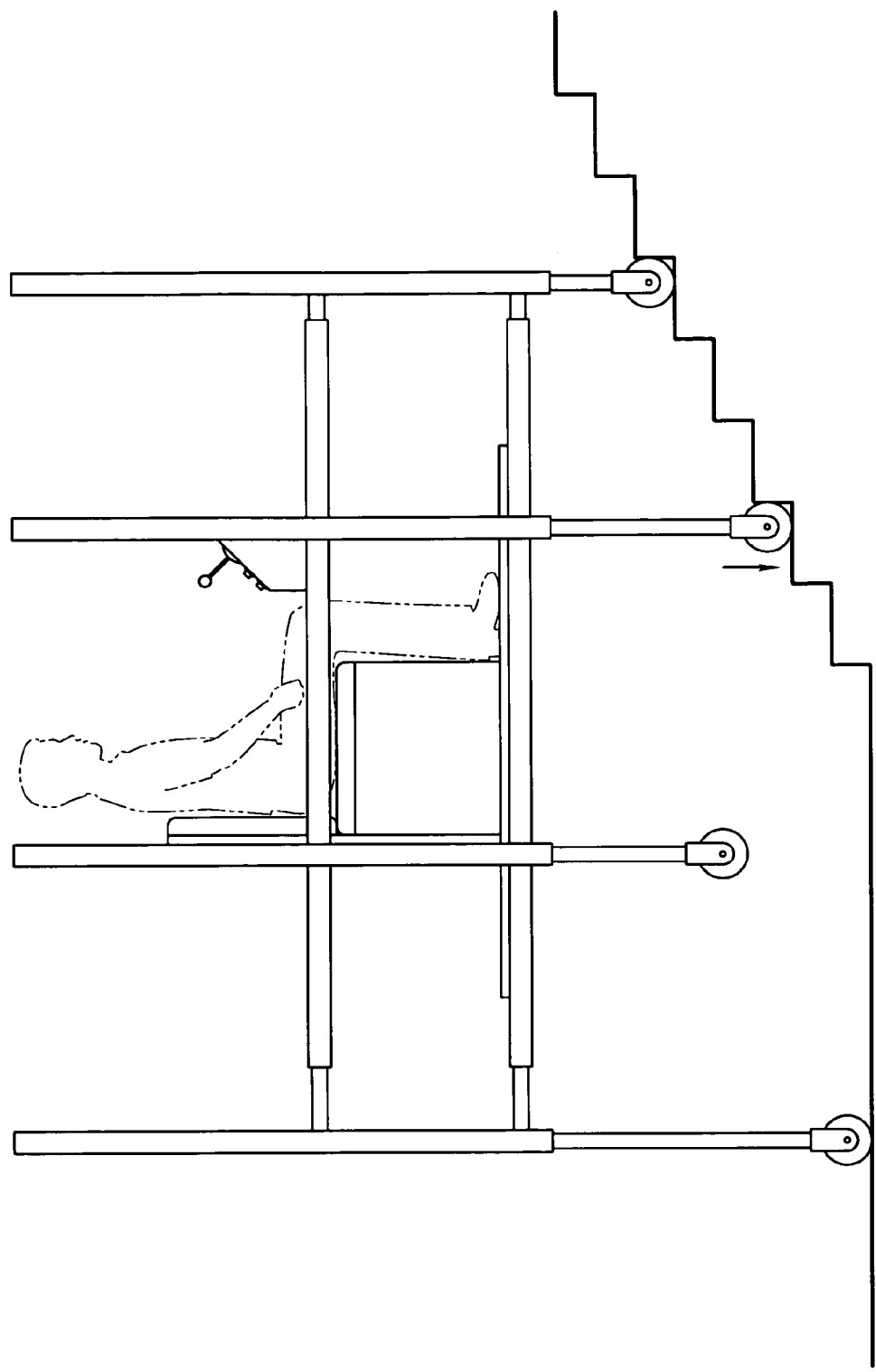
FIG. 13 shows how the vehicle is resting on the first, second and fourth set of ground contacting modules as part of a sequence of negotiating stairs

FIG. 13 shows ground contacting modules 320 (not shown) and 322 lowered over the stair. If desired, vehicle 10 moves forward until the ground contacting modules are in contact with the riser of that stair.

Figure 14:
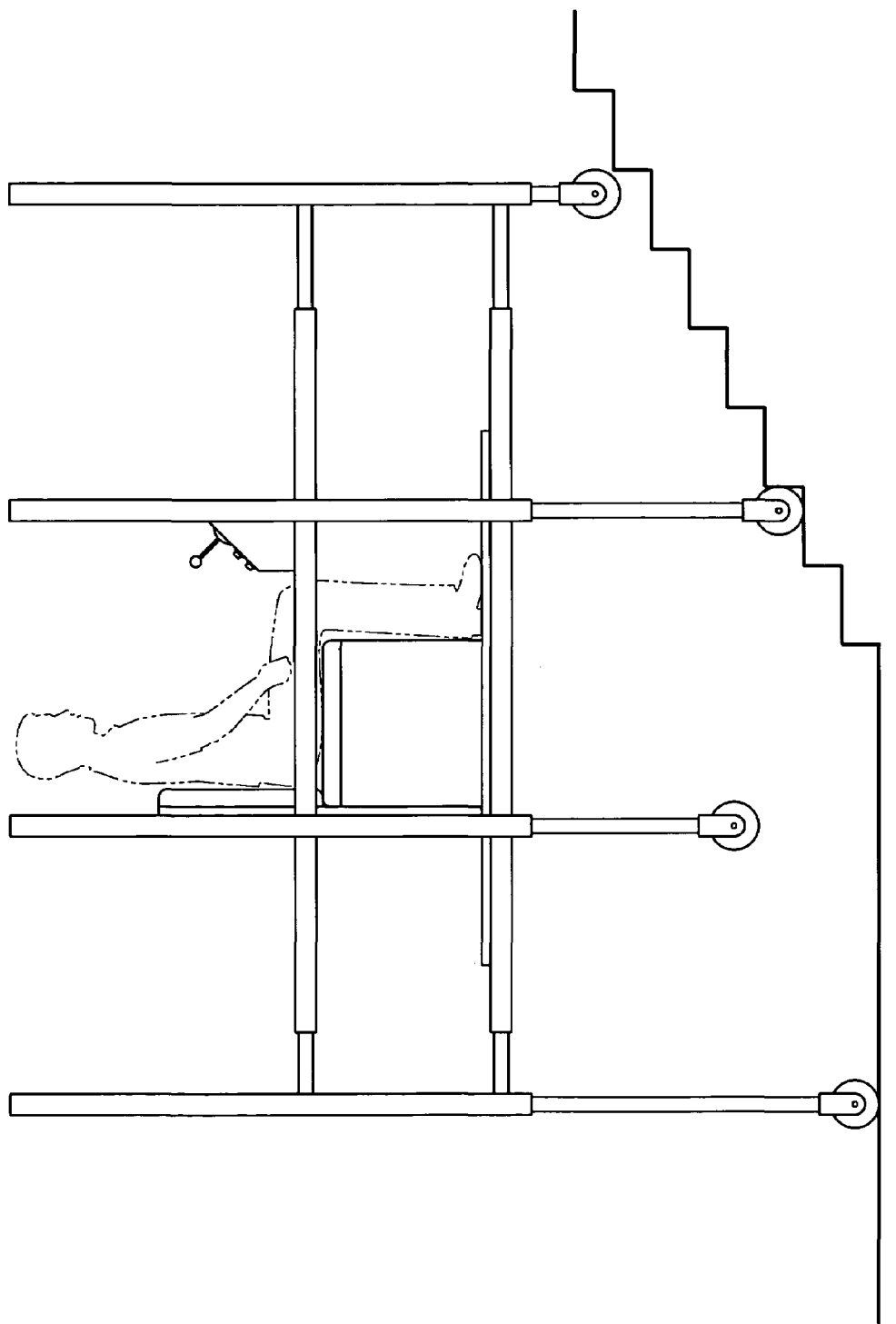
FIG. 14 illustrates the vehicle resting upon the second set and fourth set of ground contacting modules as the first set of ground contacting modules 310 and 312 are retracted and then extended forward to a position above the next stair.

FIG. 14 shows vehicle 10 resting on ground contacting modules 320 (not shown), 322, 340 (not shown) and 342. Lower vertical rods 210 and 212 have been retracted to raise ground contacting modules 310 and 312 respectively and extending and retracting horizontal rods 715, 725, 735, 745 have been extended forwards to position ground contacting modules 310 and 312 over a higher stair.

Figure 15:
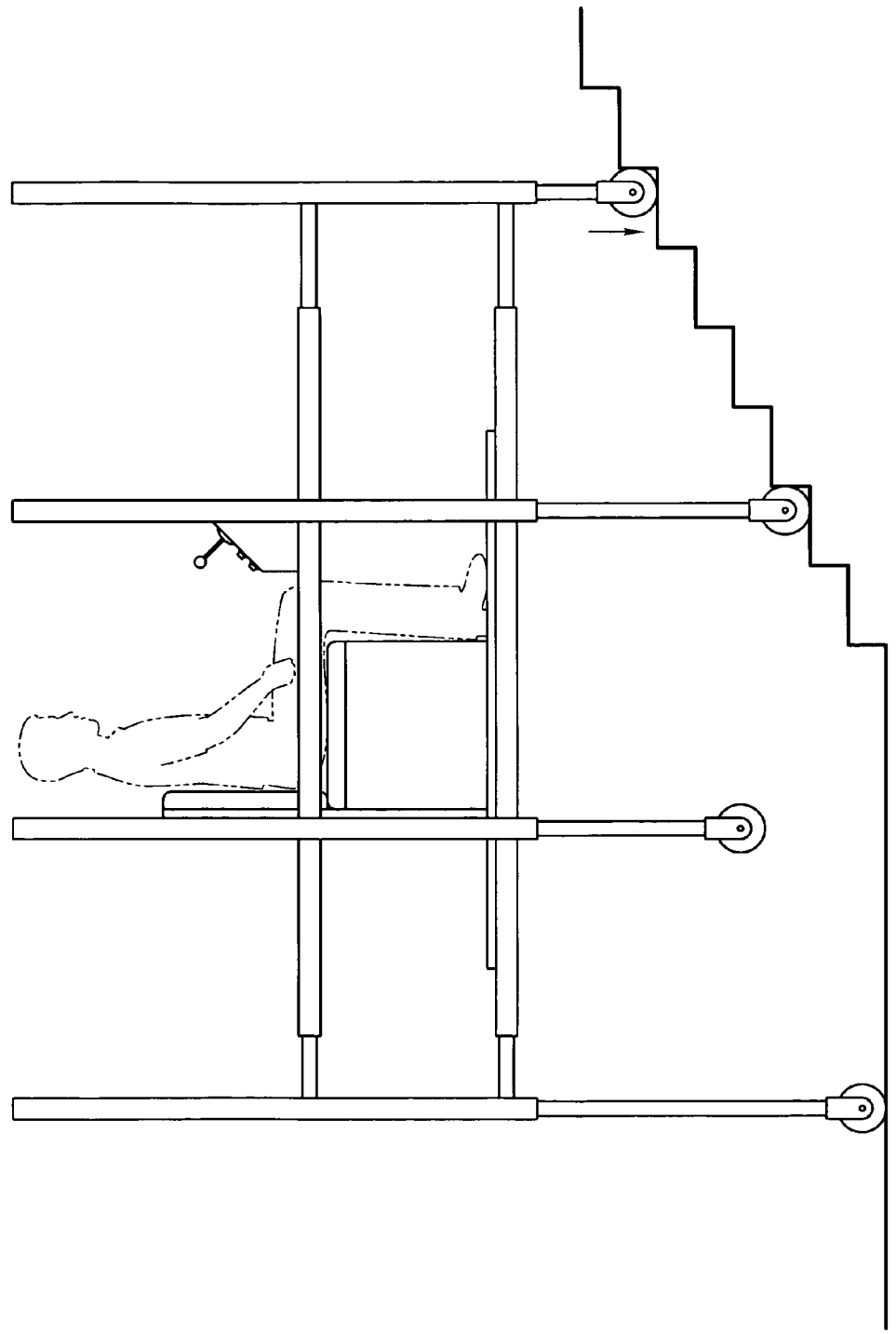
FIG. 15 illustrates of the first set of ground contacting modules of the vehicle in accordance with this invention are lowered to be positioned upon a stair.

FIG. 15 shows ground contacting modules 310 and 312 lowered to make contact with the higher stair, such that vehicle 10 is resting on ground contacting modules 310, 312, 320, 322, 340 and 342.

Figure 16:
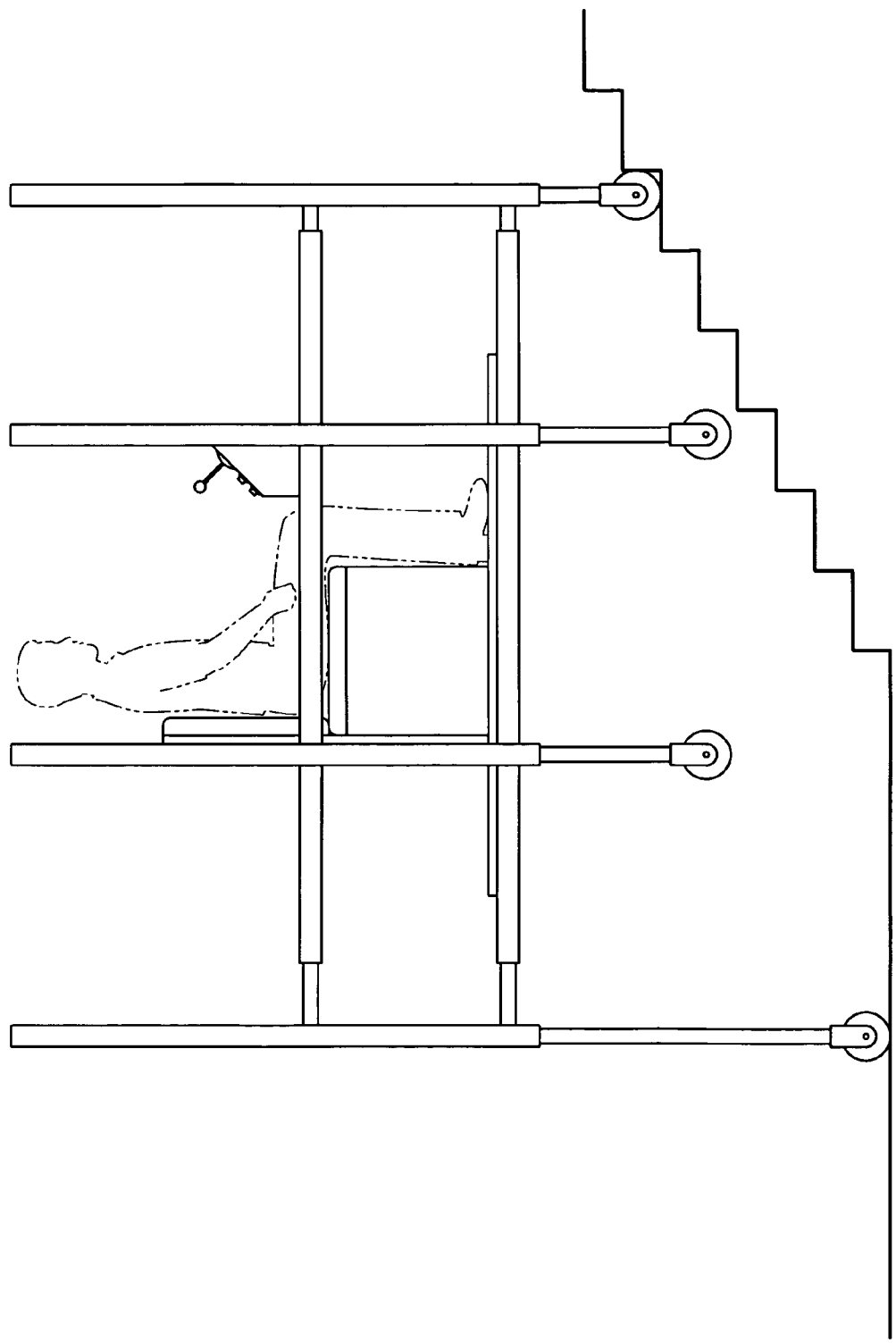
FIG. 16 shows the vehicle resting on the first set of ground contacting modules 310 and 312 and fourth set ground contacting modules 340 and 342 as the second set of ground contacting modules 320 and 322 are positioned to a height slightly higher than stair 3 and the horizontal extending and retracting rods to the fore of the vehicle are in a retracted mode as the ground contacting modules 320 and 322 are closer to 310 and 312 when ground contacting members 320 and 322 are positioned on a stair closer to the stair upon which ground contacting modules 310 and 312 are resting.

FIG. 16 shows vehicle 10 resting in a stable manner on ground contacting modules 310 (not shown), 312, 340 (not shown) and 342. Lower vertical rods 220, 222, and their respective ground contacting modules 320 and 322 and lower vertical rods 230 and 232 and their respective ground contacting modules 330 and 332 are retracted upwards to lift such ground contacting modules to an elevation to permit ground contacting modules 320 and 322 to be positioned above the stair upon which such ground contacting modules are intended to be placed. Vehicle 10 moves toward the stairs to position ground contacting modules 320 and 322 over a stair. As the vehicle moves forward, the forward extending and retracting horizontal rods 715, 725, 735 and 745 are retracting as the vehicle approaches the stairs. Ground contacting modules 320 and 322 are placed over the next intended stair.

Figure 17:
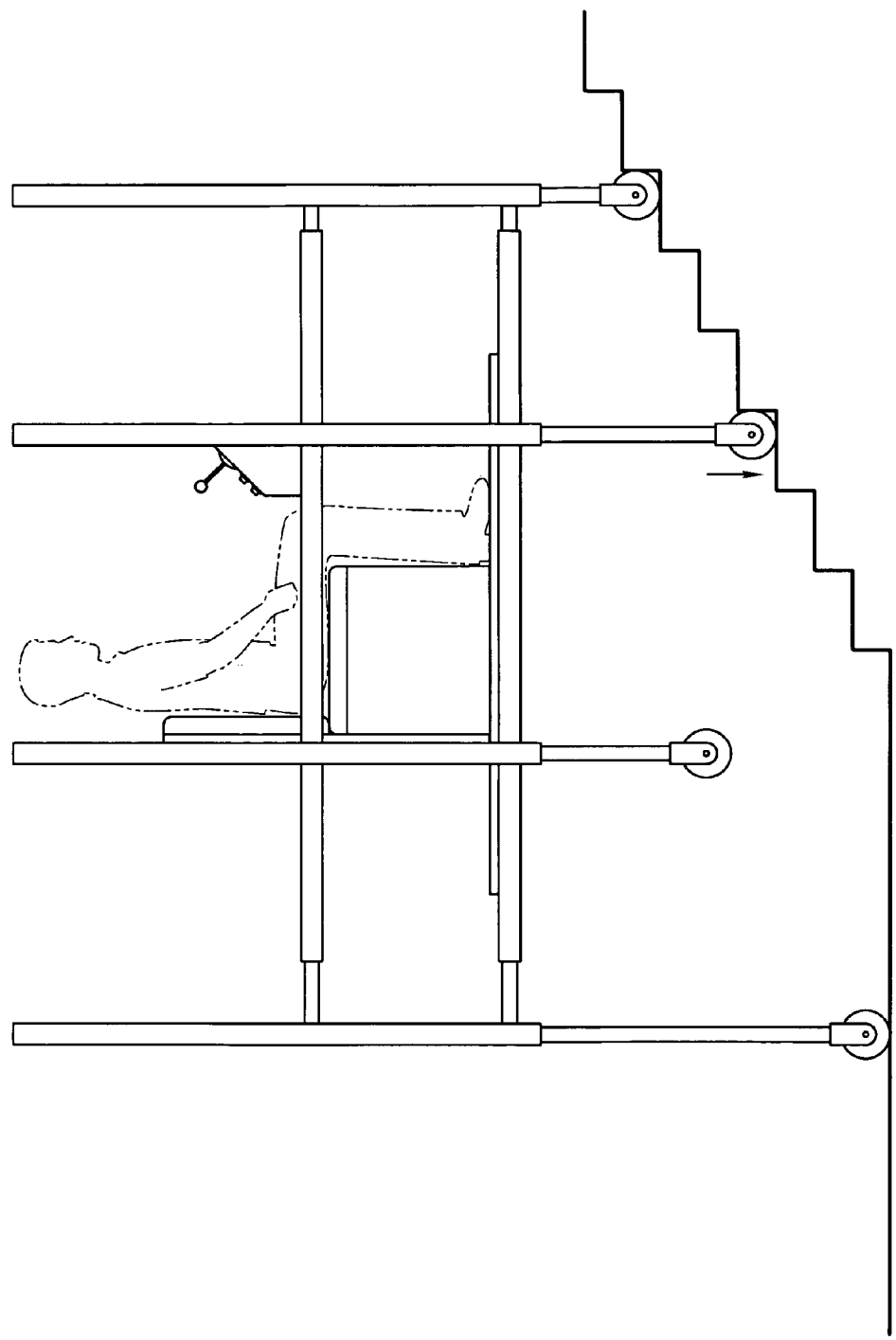
FIG. 17 shows the vehicle as part of its negotiating a flight of stairs having the second set of ground contacting modules 320 and 322 extended downwards from the frame to be positioned upon a stair.

FIG. 17 shows ground contacting modules 320 (not shown) and 322 lowered to rest on the stair.

Figure 18:
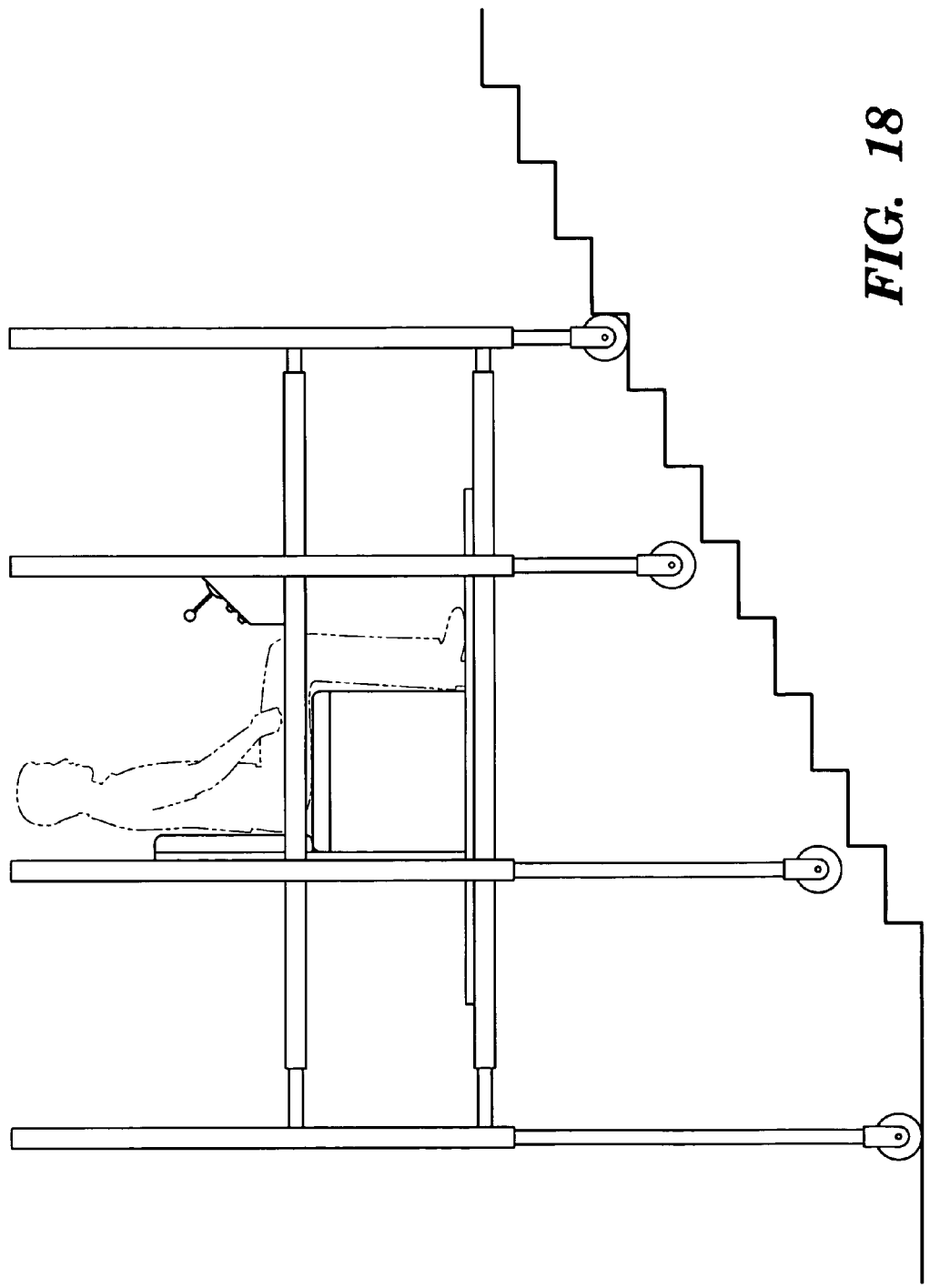
FIG. 18 illustrates how the vehicle of the present invention negotiates stairs by positioning the second set of ground contacting modules 320 and 322, and third sets of ground contacting modules 330 and 332 over their respective next stair as the vehicle moves forward and as the extending and retracting horizontal rods 715, 725, 735 and 745 retract to permit the second and third ground contacting modules to be positioned over their respective next stairs.

FIG. 18 shows vehicle 10 resting in a stable manner on ground contacting modules 310 (not shown), 312, 340 (not shown) and 342. Lower vertical rods 220, 222 and their respective ground contacting modules 320 and 322 and lower vertical rods 230 and 232 and their respective ground contacting modules 330 and 332 are retracted upwards to lift such ground contacting modules to an elevation to permit ground contacting modules 320 and 322 to be positioned on their next respective higher stair. Vehicle 10 moves toward the stairs to position ground contacting modules 320 and 322 over a stair. As the vehicle moves forward, the forward extending and retracting horizontal rods 715, 725, 735 and 745 are retracting as the vehicle approaches the stairs. The horizontal extending and retracting rods at the aft of the vehicle 815 (not shown) 825 (not shown), 835, and 845 may extend to permit ground contacting modules 330 and 332 to be farther apart from ground contacting modules 340 and 342, as ground contacting modules 330 and 332 are positioned over a higher stair. Ground contacting modules 320 and 322 are placed above their respective next intended stair.

Figure 19:
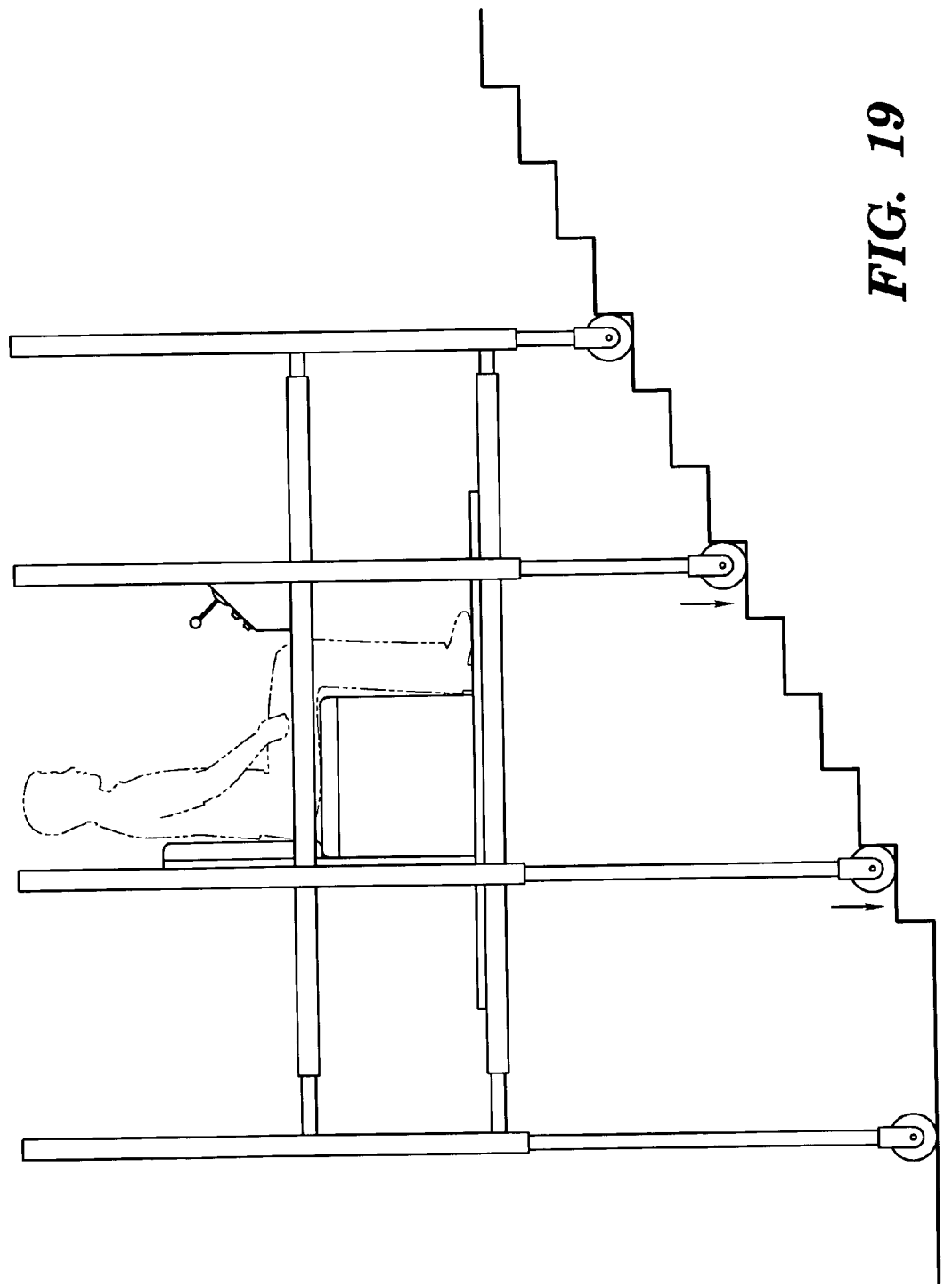
FIG. 19 depicts the second set of ground contacting modules 320 and 322 and third sets of ground contacting modules 330 and 332 lowered to be positioned upon their respective stairs by extending their lower vertical rods downward.

FIG. 19 shows ground contacting modules 320 (not shown) and 322 and 330 (not shown) and 332 of vehicle 10 lowered to rest on the stair.

Figure 20:
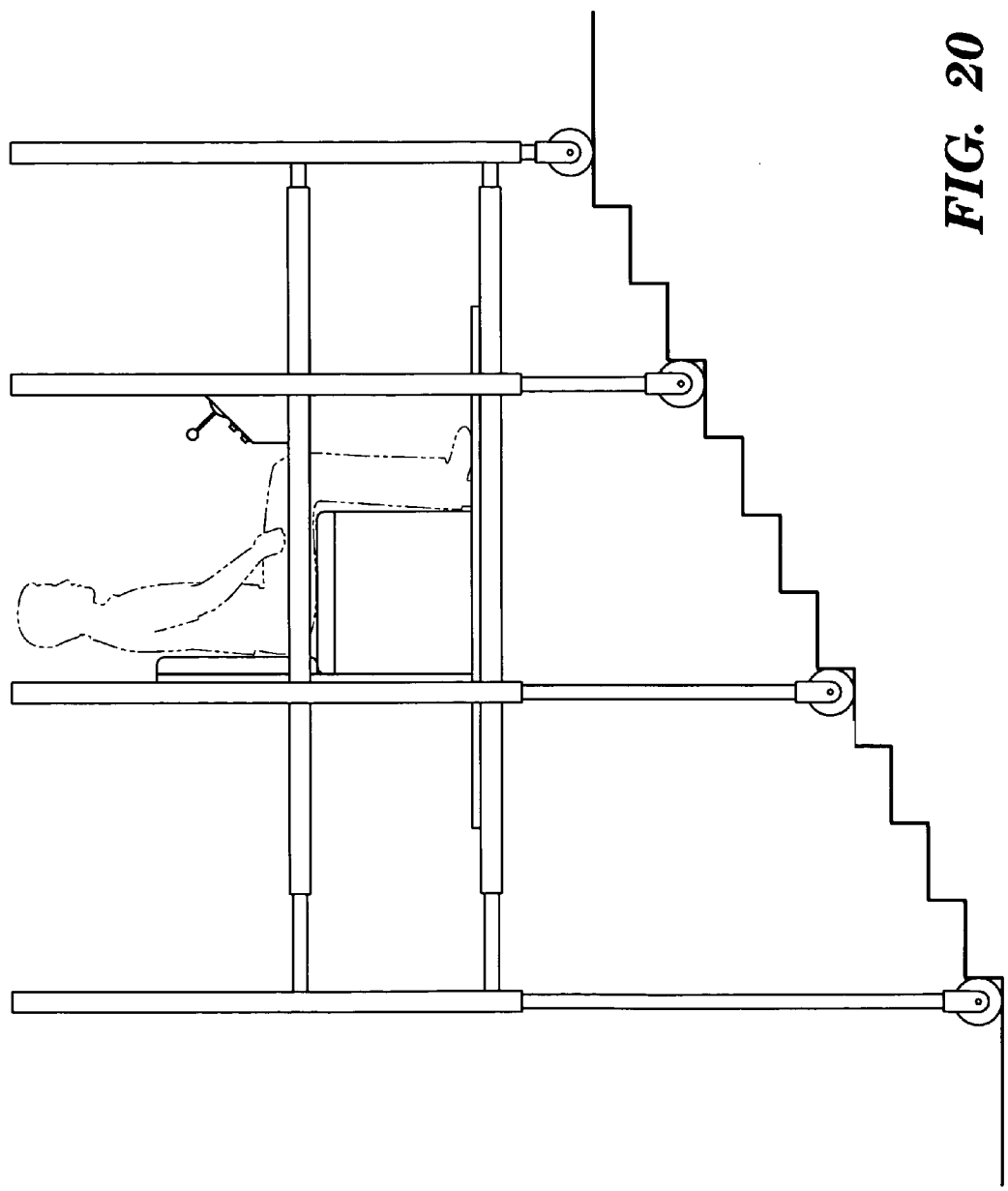
FIG. 20 shows the vehicle of the present invention with all ground contacting modules resting to support the vehicle prior to the last set of lower vertical rods 240 (not shown) and 242 being retracted to lift their respective ground contacting modules 340 (not shown) and 342.

FIG. 20 shows vehicle 10 with ground contacting modules 310 (not shown) and 312 on the landing above the stairs; ground contacting modules 320 (not shown) and 322 resting on a stair below the landing; ground contacting modules 330 (not shown) and 332 resting on a stair below the stair upon which ground contacting modules 320 and 322 are resting; and ground contacting modules 340 (not shown) and 342 resting at the foot of the stairs. Horizontal extending and retracting rods 815, 825, 835 and 845 are extended at the aft of the vehicle. Vehicle 10 is stable and lower vertical rods are extended at different lengths to keep the frame and platform level. A user is seated.

Figure 21:
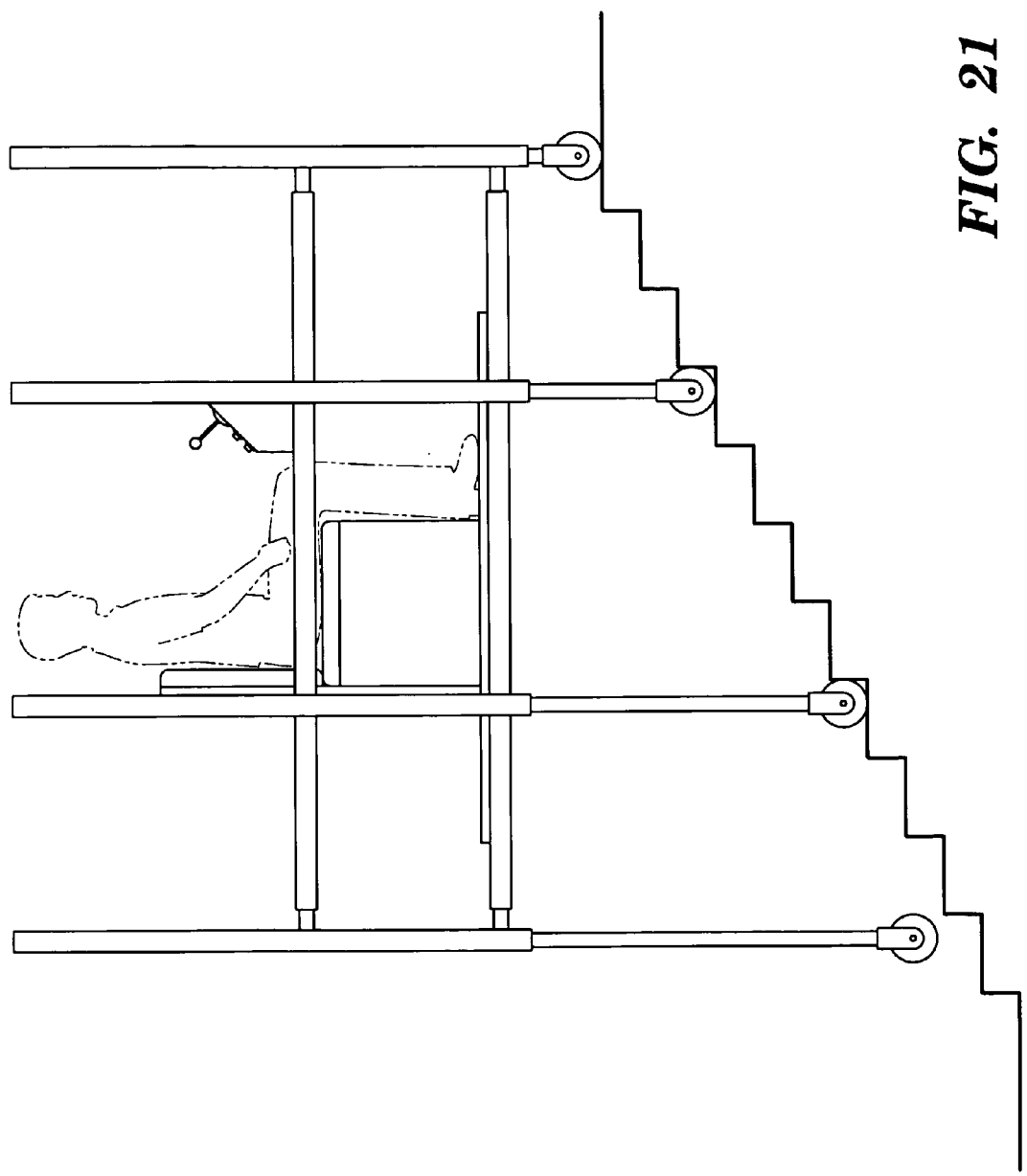
FIG. 21 illustrates the last set of ground control modules 340 and 342 lifted by retracting their respective lower vertical rods and the extending and retracting horizontal rods to the aft 815, 825, 835, and 845 retracting toward the vehicle to place the fourth set of ground control modules 340 and 342 over the first stair.
Figure 22:
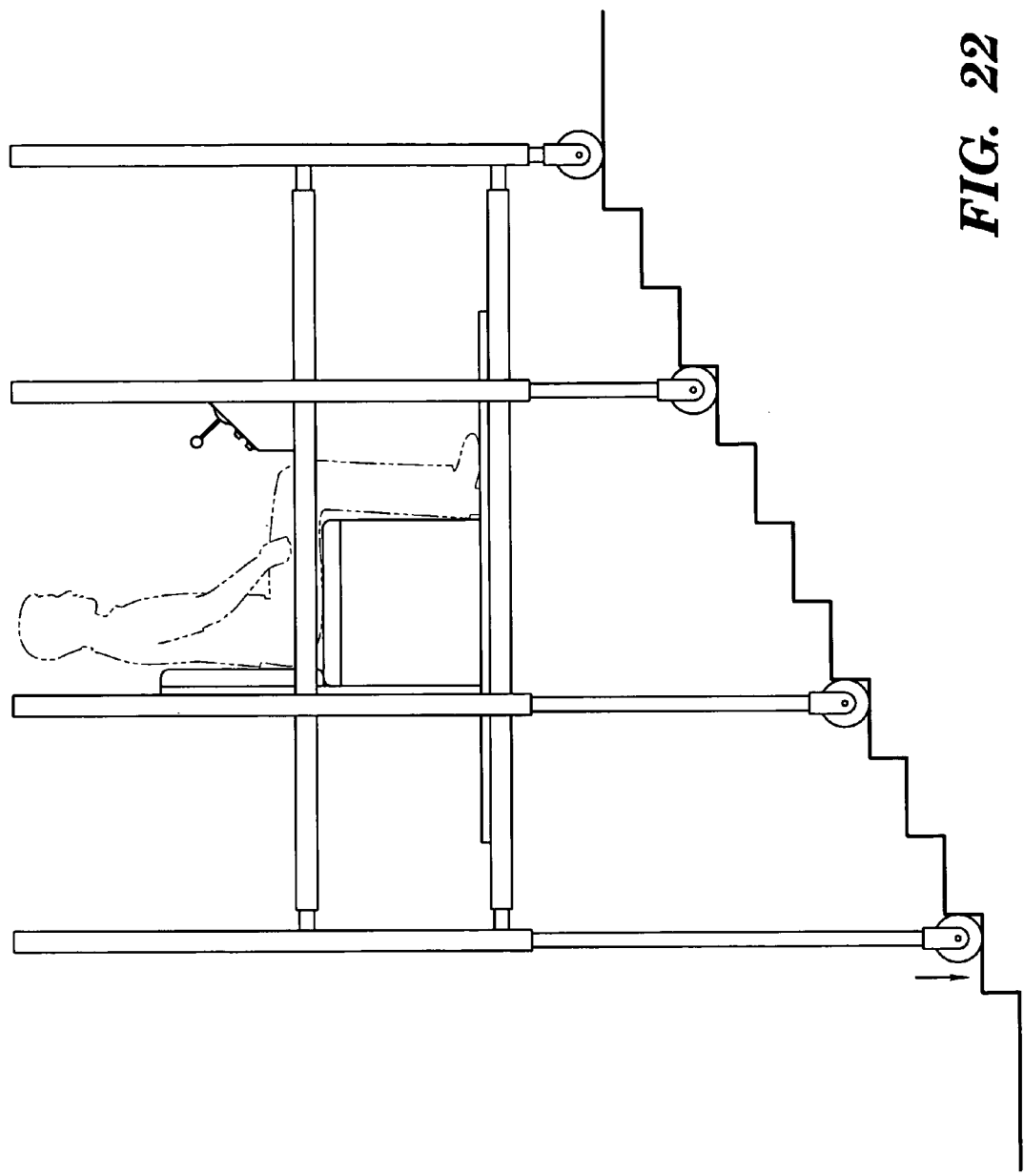
FIG. 22 shows the vehicle in accordance with the present invention resting on all four sets of ground contacting modules with the first set of ground contacting modules on the landing and the other ground contacting modules on their respective stairs.

FIGS. 21 and 22 show the ground contacting modules 340 (not shown) and 342 lifted and placed on a higher stair as the other ground contacting modules are resting on their respective stairs or the landing at the top of the stair.

Figure 23:
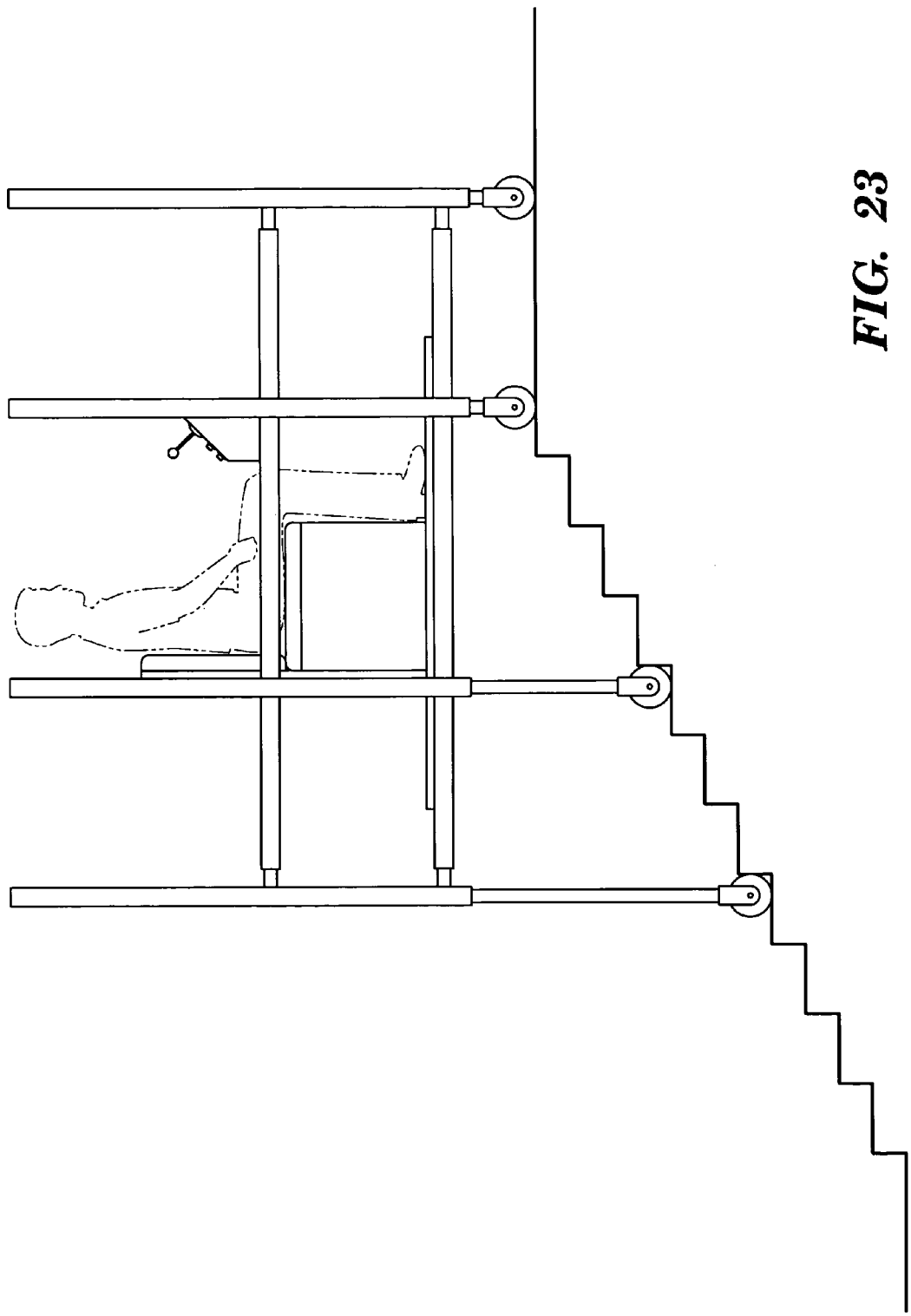
FIG. 23 illustrates the vehicle of the present invention with the first two sets of ground contacting modules on the landing the third and fourth ground contacting modules resting upon their respective stairs.

FIG. 23 shows the position of ground contacting modules 310 and 312 and 320 and 322 on the landing as the vehicle moves up the stair and forward.

Figure 24:
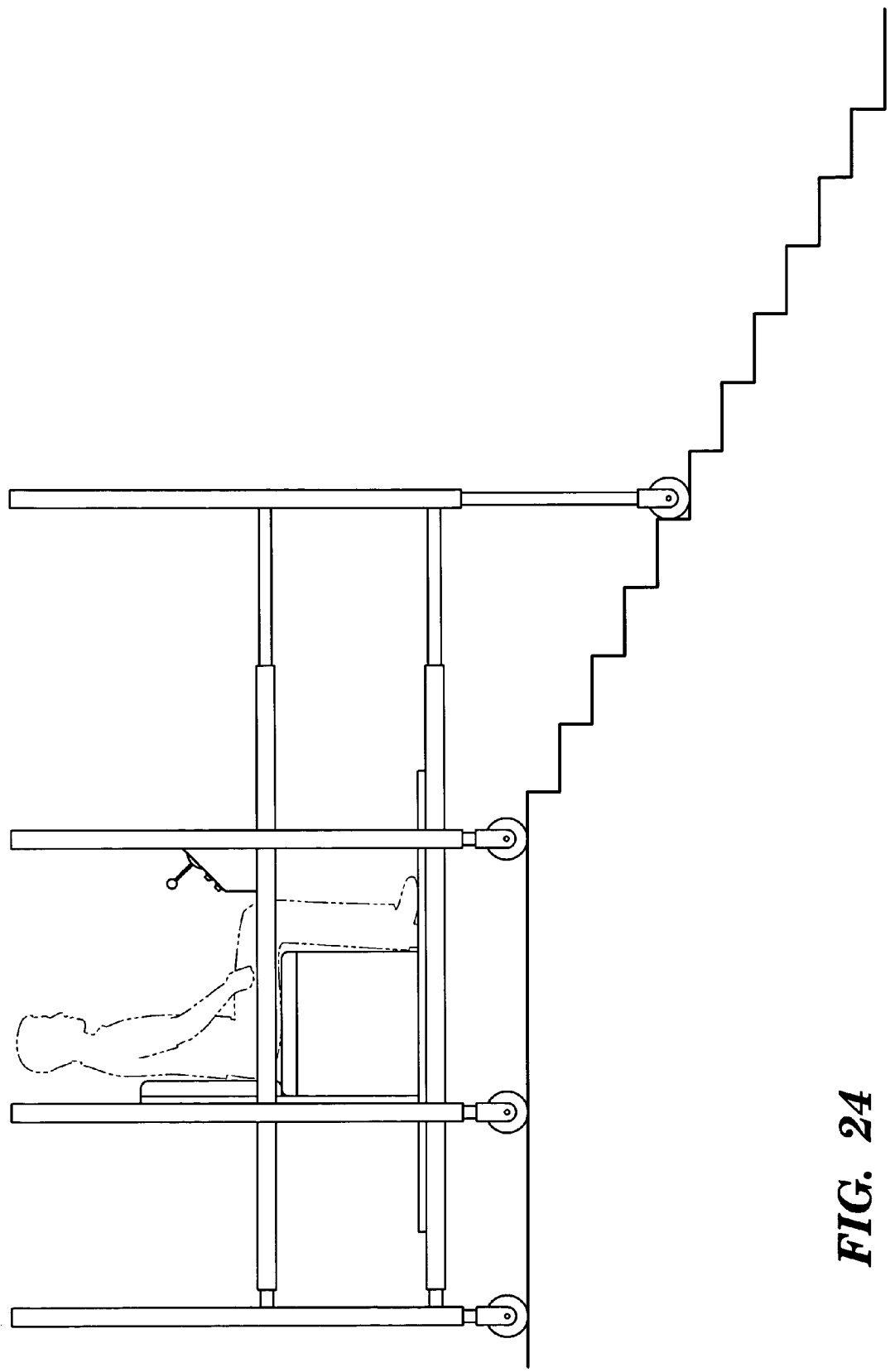
FIG. 24 shows a sideways view of the vehicle beginning a descent of stairs with the horizontal extending and retracting rods to the fore of the vehicle extended to forwards to a distal stair and the first set of lower vertical rods extended to place their respective ground contacting modules upon a stair below the landing.
Figure 25:
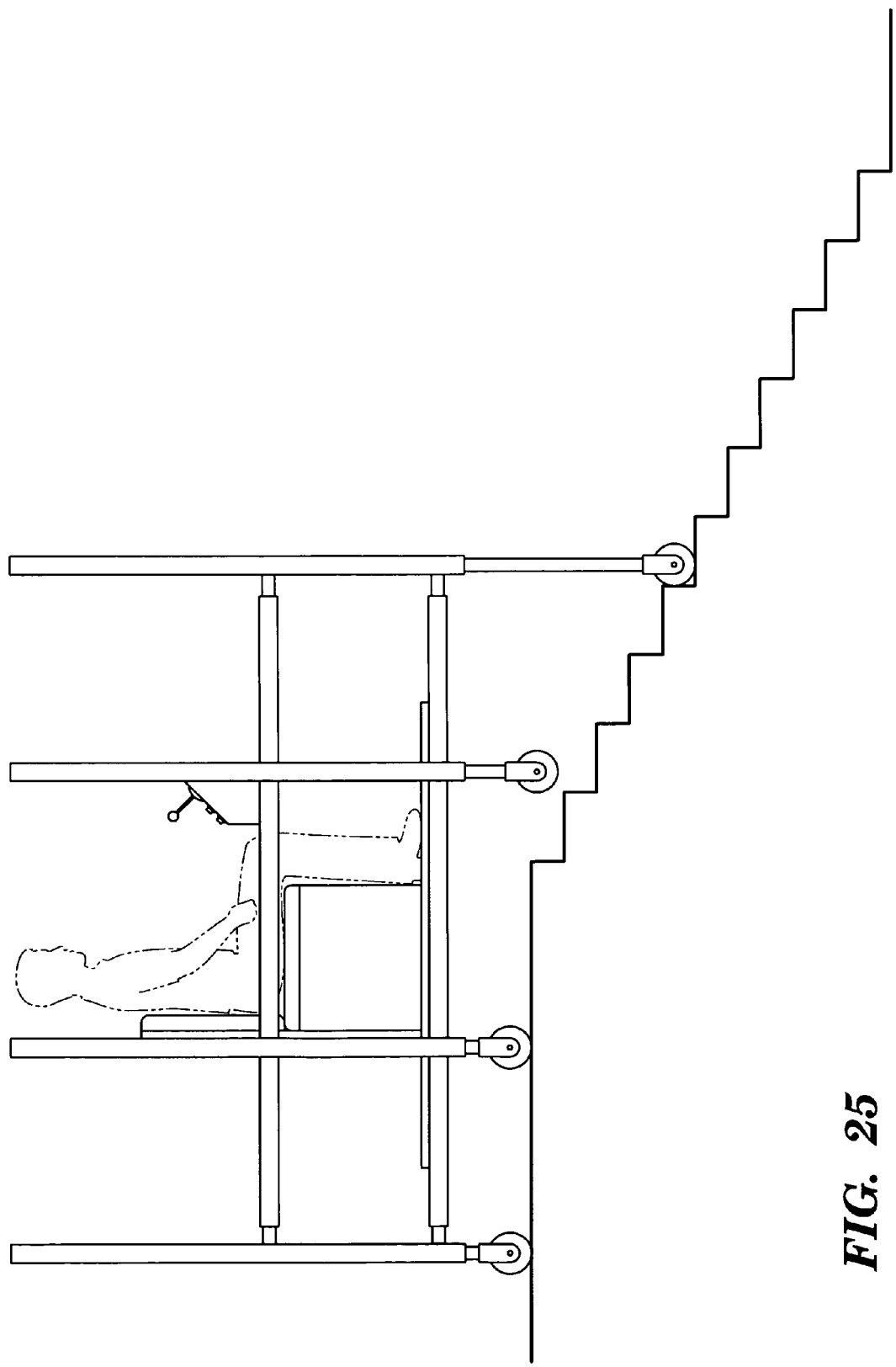
FIG. 25 illustrates the vehicle resting upon the first set, third set and fourth set of ground contacting modules 310, 312, 330, 332, and 340 and 342 while the vehicle moves forward, the horizontal extending and retracting rods to the fore of the vehicle are retracted to permit the second set of ground contacting moddules 320 and 322 to be brought close to ground contacting members 310 and 312 such that ground contacting members 320 and 322 can to be positioned over a stair.
Figure 26:
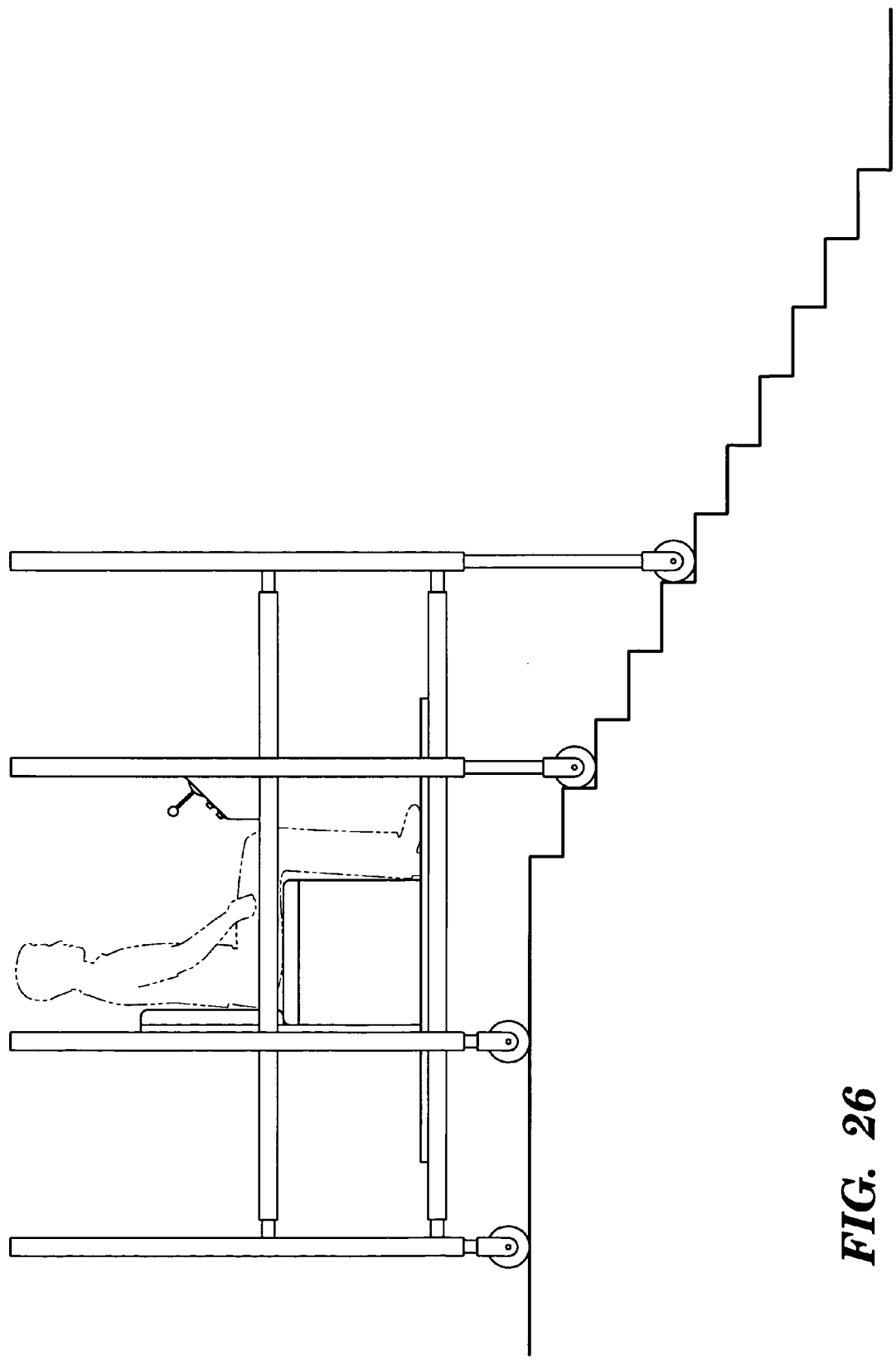
FIG. 26 shows the vehicle stable and level as the first set of ground contacting modules and second set of ground contacting modules are resting on stairs and the third set of ground contacting modules and fourth set of ground contacting modules are resting on a landing as the vehicle of the present invention negotiates a descent of stairs.

FIGS. 24-26 show vehicle descending. These views show that stability is maintained and the frame and platform are level as vehicle 10 with a rider descend stairs utilizing horizontal extending and retracting rods and lower vertical rods to descend stairs.

Figure 27:
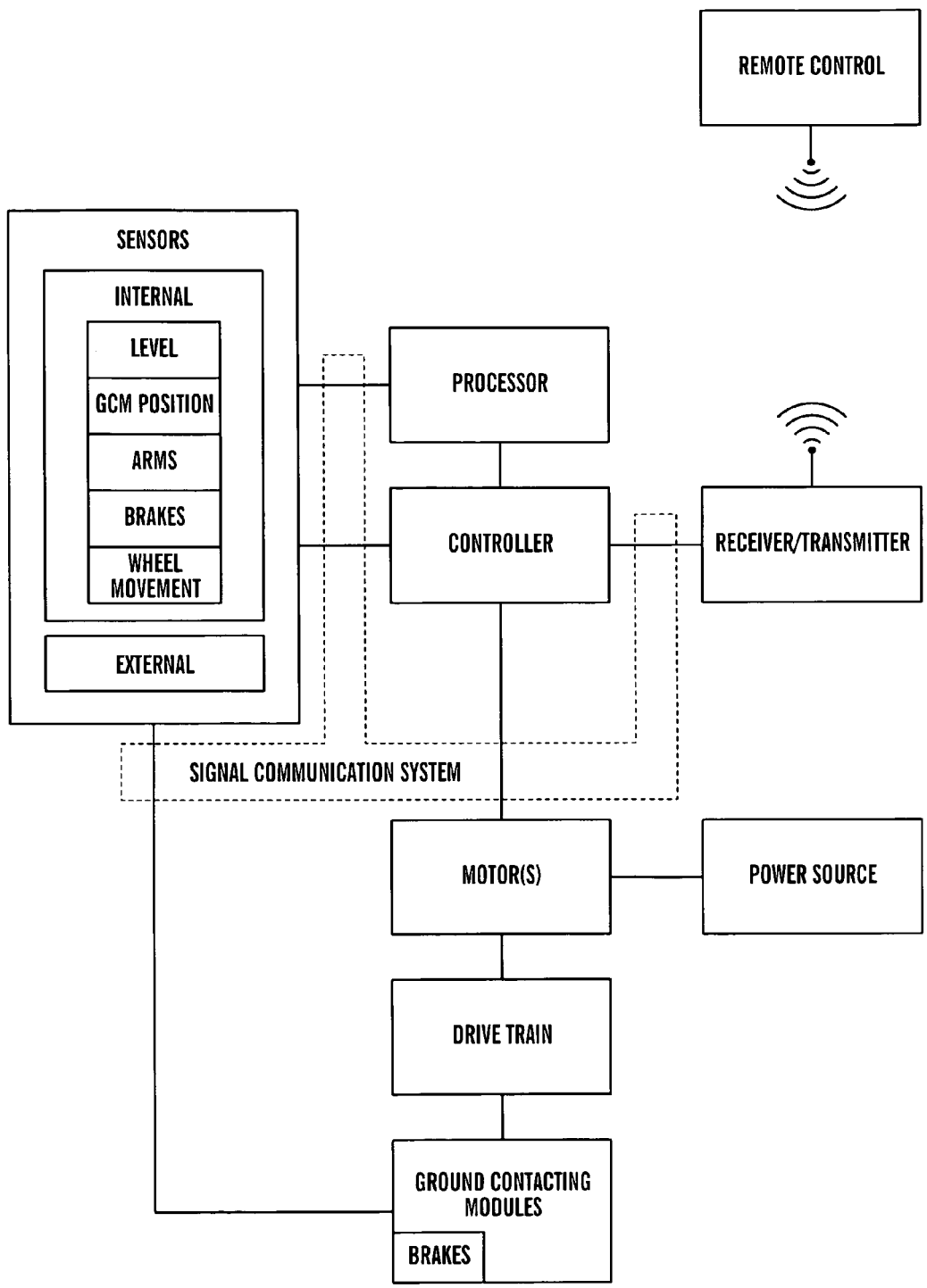
FIG. 27 is a block diagram of the system architecture of an embodiment of the present invention.

FIG. 27 shows a block diagram of an embodiment of the present invention. At least one motor drives ground contacting modules to move vehicle 10 and also to power the extending and retracting rods. At least one drive train drives the wheels of the ground contacting modules. A power supply powers the motors and provides electric power to the processor, controller and sensors. A signal communications systems which may be wired or wireless connects the sensors, processor, controller, receiver, ground contacting modules motors and drive train. A remote control may control the controller and be in bilateral communication vehicle 10. On board sensors sense external conditions and internal information such as wheel movement, brakes, extension and retraction of rods, speed, position or how level the frame remains and provide feed back to the processor.

Figure 28:
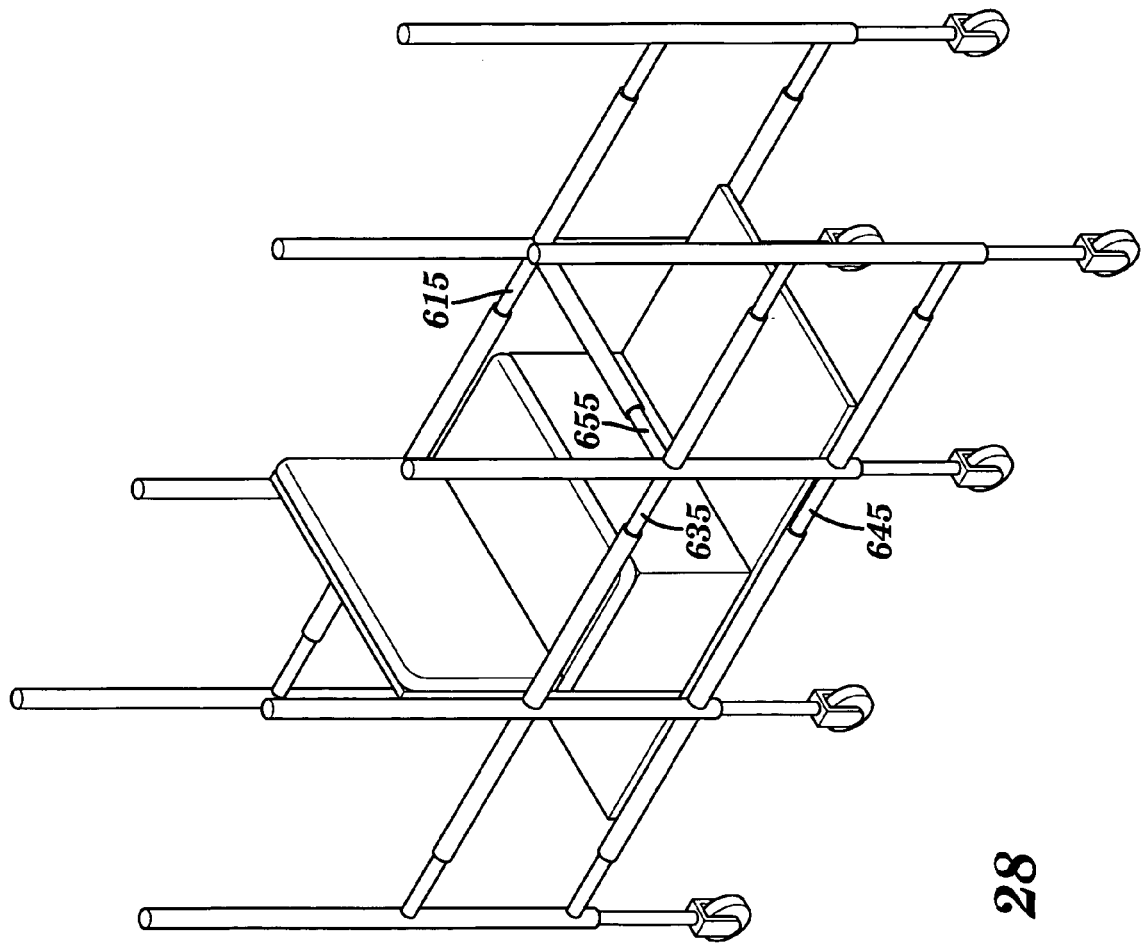
FIG. 28 shows an embodiment of this invention with the extending and retracting horizontal rods also between the second and third set of vertical rods.

Referring to FIG. 28 there is shown vehicle 10 in an embodiment with extending and retracting rods to increase or decrease the size of the frame either fore to aft or transverse from side to side. Horizontal rods 615, 625, 635, 645 are shown. Transverse extending and retracting rods 655 and 665, 675 and 685 are illustrated for increasing or decreasing the width from side to side.

Figure 29:
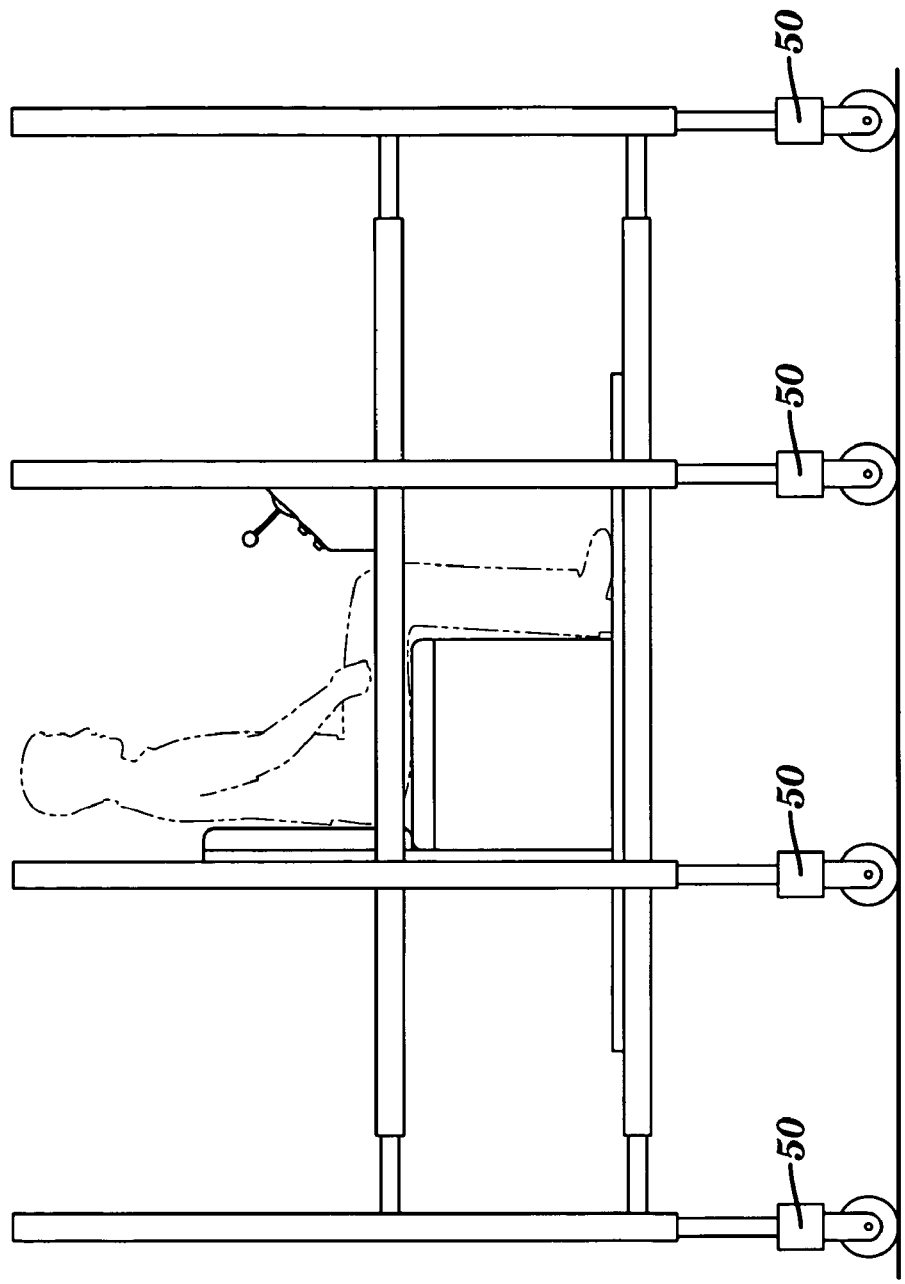
FIG. 29 illustrates a side view of an embodiment of the invention with motors coupled to each ground contacting module to power the respective ground contacting modules to move the vehicle and to power the respective lower vertical rods to extend and retract.

FIG. 29 shows an embodiment of at least one ground contacting module with wheels mounted upon an axle driven by a motor that can function independent of any other motors. Mounted on each ground contacting member is one or more axles upon which one or more rotating wheels secured to that axle. Vehicle 10 moves upon the wheels in the selectively desired direction and speed and is driven by one or more motors. The motors are electrically connected to a controller (not shown). FIG. 29 shows in an embodiment at least one motor (50) coupled to a ground contacting module. Each motor of this embodiment can function independent of each other.

Figure 30:
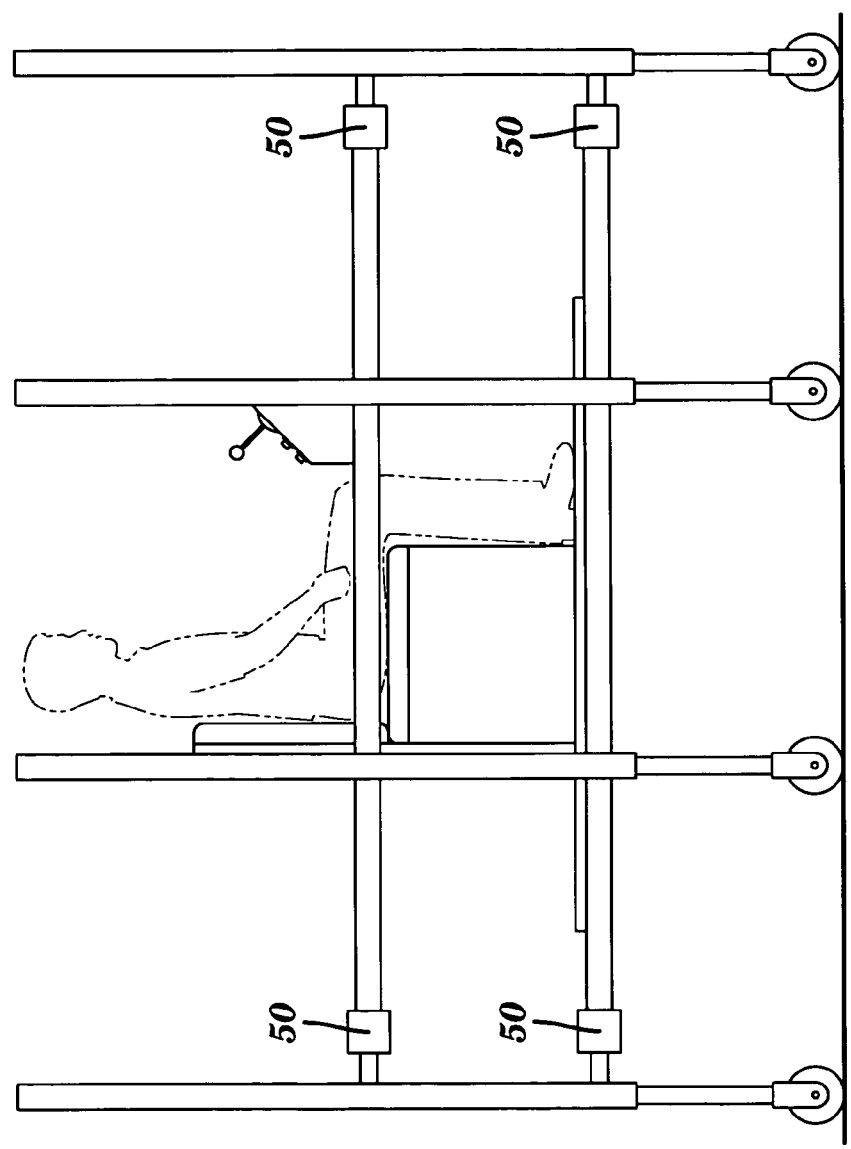
FIG. 30 an embodiment of this invention showing motors coupled to the each of the horizontal rods to power the horizontal extending and retracting rods coupled to each respective horizontal rod.

FIG. 30 shows in an embodiment at least one motor (50) coupled to a horizontal rod.

Some additional unique features of this vehicle design are:

Pursuant to a feature of this invention, a plurality of horizontal extending and retracting rods are separate mechanisms, in embodiments, that provide the vehicle with capability to extend independent ground contacting modules to the fore and aft of the vehicle over or past an obstacle or over a stair while the frame of the vehicle is stationary. The first set of vertical rods and the last set of vertical rods are mounted on the horizontal extending and retracting rods, while in embodiments the second and third sets of vertical rods are mounted to the frame. Also, as the vehicle moves forward and a second set of ground control modules are moved closer the first set of ground control modules, the horizontal extending and retracting rods retract. The vehicle is designed such that it can lift all ground contacting modules off the surface independently and extend all ground contacting modules independently to a surface and lift the frame to elevate it from the surface or lower the frame closer to a surface. The vehicle uses extension and retraction rods to lift ground contacting modules off the ground, lift the frame higher, extend and retract ground contacting modules to the fore and to the aft, all while retaining the frame in a stable manner. The horizontal and vertical rods can be hollow tubes used for electric wiring, drive trains, or wires to send bidirectional signals. In embodiments, such rods may telescope. The vehicle incorporates a sensing system to allow for measurement of the obstacles or stairs and for precision motion to navigate same.

Another unique feature of an embodiment of the present invention is that the vehicle while moving on a surface can climb onto any platform in a similar manner as it climbs onto a stair.

Examples of embodiments of the present invention are described more fully below.

An illustrative embodiment of the present invention provides a sequence for vehicle 10 for the ascent of stairs from a variety of sequences available, without limitation:

Sequence 1
Ground contacting modules 310, 312, 320, 322, 330, 332, 340 and 342 are resting on the floor in front of stairs with 310 and 312 in position in proximity to the riser for stair one.

Sequence 2
Lower vertical rods 210, 212, 220, 222, 230, 232, 240 and 242 extend to lift vehicle 10 vertically off the floor so that lower left fore to aft horizontal rods 125 and 725 and lower right fore to aft horizontal rod 145 and 745 and the platform 30 are raised to height higher than the flat surface of the fifth stair.

Sequence 3
Ground contacting modules 310 and 312 are retracted up off the floor and horizontal rods 715, 725, 735 and 745 are extended forward over stair 5 to position ground contacting modules 310 and 312 directly over stair 5.

Sequence 4
Ground contacting modules 310 and 312 are lowered onto stair five.

Sequence 5
Ground contacting modules 320, 322, 330 and 332 are retracted off the ground so that the vehicle is kept stable by resting on ground contacting modules 310, 312, 340 and 342 and entire vehicle 10 moves forward, and extending and retracting horizontal rods 715, 725, 735 and 745 are retracting as vehicle 10 moves towards the stairs so that ground contacting modules 320 and 322 can be positioned over stair 2.

Sequence 6
Ground contacting modules 320 and 322 are lowered onto stair 2.

Sequence 7
Lower vertical rods 210, 212, 220, 222, 240 and 242 extend to lift up vehicle 10 sufficiently to a height such that ground contacting modules 310 and 312 are at a height slightly higher than stair 6.

Sequence 8
While the vehicle is kept stable by resting on ground contacting modules 320, 322 and 340 and 342, the extending and retracting horizontal rods 715, 725, 735 and 745 extend to position ground contacting modules 310 and 312 over stair 6.

Sequence 9
Ground contacting modules 310 and 312 are lowered onto stair 6.

Sequence 10
With ground contacting modules 310 and 312 resting on stair 6 and ground contacting modules 340 and 342 resting on the floor to keep vehicle 10 stable, lower vertical rods 220, 222, 230 and 232 are retracted thereby lifting ground contacting modules 320, 322, 330 and 332 to a height that ground contacting modules are at a height higher than stair 3.

Sequence 11
Vehicle 10 moves forward toward the stairs to position ground contacting modules 320 and 322 over stair 3, while extending and retracting horizontal rods 715, 725, 735 and 745 retract to permit ground contacting modules 320 and 322 to be positioned over stair 3.

Sequence 12
Ground contacting modules 320 and 322 are positioned on stair 3 by extending lower extending and retracting rods 220 and 222 to position ground contacting modules 320 and 322 firmly on stair 3.

Sequence 13
With ground contacting modules 320 and 322 resting on stair 3 and with ground contacting modules 340 and 342 resting on the floor to maintain stability, lower vertical rods 220, 222, 240 and 242 extend to lift up vehicle 10 sufficiently to a height such that ground contacting modules 310 and 312 are at a height higher than stair 7.

Sequence 14
While the vehicle is kept stable by resting on ground contacting modules 320, 322 and 340 and 342, the extending and retracting horizontal rods 715, 725, 735 and 745 extend to position ground contacting modules 310 and 312 over stair 7.

Sequence 15
Ground contacting modules 310 and 312 are lowered onto stair 7.

Sequence 16
With ground contacting modules 310 and 312 resting on stair 7 and ground contacting modules 340 and 342 resting on the floor to keep vehicle 10 stable, lower vertical rods 220, 222, 230 and 232 are retracted thereby lifting ground contacting modules 320, 322, 330 and 332 to a height that ground contacting modules are at a height higher than stair 4.

Sequence 17
Vehicle 10 moves forward toward the stairs to position ground contacting modules 320 and 322 over stair 4, while extending and retracting horizontal rods 715, 725, 735 and 745 retract to permit ground contacting modules 320 and 322 to be positioned over stair 4.

Sequence 18
Ground contacting modules 320 and 322 are positioned on stair 4 by extending lower extending and retracting rods 220 and 222 to position ground contacting modules 320 and 322 firmly on stair 4.

Sequence 19
With ground contacting modules 320 and 322 resting on stair 4 and with ground contacting modules 340 and 342 resting on the floor to maintain stability, lower vertical rods 220, 222, 240 and 242 extend to lift up vehicle 10 sufficiently to a height such that ground contacting modules 310 and 312 are at a height higher than stair 8.

Sequence 20
While the vehicle is kept stable by resting on ground contacting modules 320, 322 and 340 and 342, the extending and retracting horizontal rods 715, 725, 735 and 745 extend to position ground contacting modules 310 and 312 over stair 8.

Sequence 21
Ground contacting modules 310 and 312 are lowered onto stair 8.

Sequence 22
With ground contacting modules 310 and 312 resting on stair 8 and ground contacting modules 340 and 342 resting on the floor to keep vehicle 10 stable, lower vertical rods 220, 222, 230 and 232 are retracted thereby lifting ground contacting modules 320, 322, 330 and 332 to a height that ground contacting modules are at a height higher than stair 5.

Sequence 23
Vehicle 10 moves forward toward the stairs to position ground contacting modules 320 and 322 over stair 5, and ground contacting modules 330 and 332 over stair 1, while extending and retracting horizontal rods 715, 725, 735 and 745 retract to permit ground contacting modules 320 and 322 to be positioned over stair 5 and ground contacting modules 330 and 332 to be positioned over stair 1.

Sequence 24
Ground contacting modules 320 and 322 are positioned on stair 5 by extending lower vertical extending and retracting rods 220 and 222 to position ground contacting modules 320 and 322 firmly on stair 5, and ground contacting modules 330 and 332 are positioned on stair 1 by extending the lower vertical extending and retracting rods 230 and 232 to position ground contacting modules 330 and 332 firmly on stair 1.

Sequence 25
With ground contacting modules 320 and 322 resting on stair 5, with ground contacting modules 330 and 332 resting on stair 1 and with ground contacting modules 340 and 342 resting on the floor to maintain stability, lower vertical rods 220, 222, 230 and 232, and 240 and 242 extend to lift up vehicle 10 sufficiently to a height such that ground contacting modules 310 and 312 are at a height higher than stair 9.

Sequence 26
While the vehicle is kept stable by resting on ground contacting modules 320, 322, 330 and 332, and 340 and 342, the extending and retracting horizontal rods 715, 725, 735 and 745 extend to position ground contacting modules 310 and 312 over stair 9.

Sequence 27
Ground contacting modules 310 and 312 are lowered onto stair 9.

Sequence 28
With ground contacting modules 310 and 312 resting on stair 9 and ground contacting modules 340 and 342 resting on the floor to keep vehicle 10 stable, lower vertical rods 220, 222, 230 and 232 are retracted thereby lifting ground contacting modules 320, 322, 330 and 332 to a height that ground contacting modules 320 and 322 are at a height higher than stair 6, and that ground contacting modules 330 and 332 are higher than stair 2.

Sequence 29
Vehicle 10 moves forward toward the stairs to position ground contacting modules 320 and 322 over stair 6, and ground contacting modules 330 and 332 over stair 2, while extending and retracting horizontal rods 715, 725, 735 and 745 retract to permit ground contacting modules 320 and 322 to be positioned over stair 6 and ground contacting modules 330 and 332 to be positioned over stair 2.

Sequence 30
Ground contacting modules 320 and 322 are positioned on stair 6 by extending lower vertical extending and retracting rods 220 and 222 to position ground contacting modules 320 and 322 firmly on stair 6, and ground contacting modules 330 and 332 are positioned on stair 2 by extending the lower vertical extending and retracting rods 230 and 232 to position ground contacting modules 330 and 332 firmly on stair 2.

Sequence 31
With ground contacting modules 320 and 322 resting on stair 6, with ground contacting modules 330 and 332 resting on stair 2 and with ground contacting modules 340 and 342 resting on the floor to maintain stability, lower vertical rods 220, 222, 230 and 232, and 240 and 242 extend to lift up vehicle 10 sufficiently to a height such that ground contacting modules 310 and 312 are at a height higher than stair 10.

Sequence 32
While the vehicle is kept stable by resting on ground contacting modules 320, 322, 330 and 332, and 340 and 342, the extending and retracting horizontal rods 715, 725, 735 and 745 extend to position ground contacting modules 310 and 312 over stair 10.

Sequence 33
Ground contacting modules 310 and 312 are lowered onto stair 10.

Sequence 34
With ground contacting modules 310 and 312 resting on stair 10 and ground contacting modules 340 and 342 resting on the floor to keep vehicle 10 stable, lower vertical rods 220, 222, 230 and 232 are retracted thereby lifting ground contacting modules 320, 322, 330 and 332 to a height that ground contacting modules 320 and 322 are at a height higher than stair 7, and that ground contacting modules 330 and 332 are higher than stair 3.

Sequence 35
Vehicle 10 moves forward toward the stairs to position ground contacting modules 320 and 322 over stair 7, and ground contacting modules 330 and 332 over stair 3, while extending and retracting horizontal rods 715, 725, 735 and 745 retract to permit ground contacting modules 320 and 322 to be positioned over stair 7 and ground contacting modules 330 and 332 to be positioned over stair 3.

Sequence 36

Ground contacting modules 320 and 322 are positioned on stair 7 by extending the lower vertical extending and retracting rods 220 and 222 to position ground contacting modules 320 and 322 firmly on stair 7, and ground contacting modules 330 and 332 are positioned on stair 3 by extending the lower vertical extending and retracting rods 230 and 232 to position ground contacting modules 330 and 332 firmly on stair 3.

Sequence 37

With ground contacting modules 320 and 322 resting on stair 7, with ground contacting modules 330 and 332 resting on stair 3 and with ground contacting modules 340 and 342 resting on the floor to maintain stability, lower vertical rods 220, 222, 230 and 232, and 240 and 242 extend to lift up vehicle 10 sufficiently to a height such that ground contacting modules 310 and 312 are at a height higher than stair 11.

Sequence 38

While the vehicle is kept stable by resting on ground contacting modules 320, 322, 330 and 332, and 340 and 342, the extending and retracting horizontal rods 715, 725, 735 and 745 extend to position ground contacting modules 310 and 312 over stair 11.

Sequence 39

Ground contacting modules 310 and 312 are lowered onto stair 11.

Sequence 40

With ground contacting modules 310 and 312 resting on stair 11 and ground contacting modules 340 and 342 resting on the floor to keep vehicle 10 stable, lower vertical rods 220, 222, 230 and 232 are retracted thereby lifting ground contacting modules 320, 322, 330 and 332 to a height that ground contacting modules 320 and 322 are at a height higher than stair 8, and that ground contacting modules 330 and 332 are higher than stair 4.

Sequence 41

Vehicle 10 moves forward toward the stairs to position ground contacting modules 320 and 322 over stair 8, and ground contacting modules 330 and 332 over stair 4, while extending and retracting horizontal rods 715, 725, 735 and 745 retract to permit ground contacting modules 320 and 322 to be positioned over stair 8 and ground contacting modules 330 and 332 to be positioned over stair 4, and while extending and retracting horizontal rods 815, 825, 835 and 845 extend to permit ground contacting modules 330 and 332 to be positioned over step 4 while the ground contacting modules 340 and 342 remain on the floor.

Sequence 42

Ground contacting modules 320 and 322 are positioned on stair 8 by extending the lower vertical extending and retracting rods 220 and 222 to position ground contacting modules 320 and 322 firmly on stair 8, and ground contacting modules 330 and 332 are positioned on stair 4 by extending the lower vertical extending and retracting rods 230 and 232 to position ground contacting modules 330 and 332 firmly on stair 4.

Sequence 43

With ground modules 310 and 312 resting on stair 11, ground modules 320 and 322 resting on stair 8 and ground modules 330 and 332 resting on stair 4 to keep vehicle 10 stable, lower vertical rods that extend and retract 240 and 242 are retracted thereby lifting ground contacting modules 340 and 342 off the floor to a height that ground contacting modules 340 and 342 are at a height higher than stair 1.

Sequence 44

Horizontal rods 815, 825, 835 and 845 are retracted forward toward the front of vehicle 10 over stair 1 to position ground contacting modules 340 and 342 directly over stair 1.

Sequence 45

Ground contacting modules 340 and 342 are lowered onto stair 1.

Descent Sequence

An illustrative embodiment of the present invention provides a sequence for vehicle 10 for the descent of stairs from a variety of sequences available, without limitation:

Vehicle 10 can also descend stairs. When vehicle 10 is at the top of flight of stairs with the fore of vehicle facing the stairs and ground contacting modules 310, 312, 320, 322, 330, 332, 340, and 342 on the floor or the landing at the top of the stairs, ground contacting modules 310 and 312 are retracted up off the floor and horizontal rods 715, 725, 735 and 745 are extended forward over the fifth stair from the landing to position ground contacting modules 310 and 312 directly over the fifth stair down from the landing. Ground contacting modules 310 and 312 are lowered onto that stair. Next, ground contacting modules 320, 322, 330 and 332 are retracted off the ground so that the vehicle is kept stable by resting on ground contacting modules 310, 312, and 340 and 342 and entire vehicle 10 moves forward, and extending and retracting horizontal rods 715, 725, 735 and 745 are retracting as vehicle 10 moves towards the stairs so that ground contacting modules 320 and 322 can be positioned over the second stair down from the landing. Ground contacting modules 320, 322, 330 and 332 are retracted off the ground so that the vehicle is kept stable by resting on ground contacting modules 310, 312, 340 and 342 and entire vehicle 10 moves forward, and extending and retracting horizontal rods 715, 725, 735 and 745 are retracting as vehicle 10 moves towards the stairs so that ground contacting modules 320 and 322 can be positioned over the stair that is two stairs down from the landing. The ground contacting modules 320 and 322 are then lowered to rest on the stair that is two stairs down from the landing. It may be readily appreciated by a person skilled in the art that, the sequence of steps for the extension and retracting of the rods can be accomplished equally easily for either ascending and descending stairs using this system and method.

The embodiments are exemplary of the variety of stair climbing sequences for the vehicle to climb up stairs, while maintaining stability. What is described above is meant to give examples of various ways that the vehicle can move over an obstacle or climb stairs. It may be readily appreciated by a person skilled in the art that, the sequence of steps for the extension and retracting of the rods can vary while accomplishing the same climbing of stairs or moving over an obstacle and that additional sequences and the like can accomplish the same actions using this system and method. It will also be appreciated by those of skill in the art, that the sequence of steps can occur as directed by a person riding the vehicle, a computer aboard the vehicle or through wireless communications between the vehicle and a remote person or remote computer.

While the ascent or descent on stairs requires no computer, it is further contemplated in other embodiments that there be no need for human to physically operate the device. In some embodiments, the operation of the device is controlled by a computer receiving information from sensors, radar and/or onboard sensors The foregoing disclosed embodiments of the present invention are intended to be illustrative and descriptive and not restrictive. They are not intended to be exhaustive or to limit the disclosure to the precise forms disclosed. Many modifications and variations will be apparent to the practitioner of the art. It is intended that the scope of the invention is defined only by the claims that follow and their equivalence.

What is claimed is:

1. A vehicle for transporting humans, robots and a payload, moving on a surface, over obstacles and for ascending and descending stairs, the vehicle comprising:
    a. eight ground contacting modules capable of moving over an underlying surface in desired directions, each independently mounted at the base of a lower vertical rod that extends and retracts;
    b. eight lower vertical rods that extend and retract from and are slidably coupled to their respective vertical rods, wherein the bidirectionally moving lower vertical rods, when powered can raise the frame off the surface when extended, or lower the frame when retracted, or can raise or lower individual ground contacting modules;
    c. eight vertical rods capable of supporting the frame, a rider and payload, arranged in two lines arrayed fore to aft, wherein two of the vertical rods are mounted to the fore of the vehicle on the horizontal extending and retracting rods to the fore of the vehicle, four of the vertical rods are mounted on the frame and two of the vertical rods are mounted to the aft of the vehicle on the horizontal extending and retracting rods to the aft of the vehicle;
    d. four horizontal rods positioned fore to aft such that one side of each horizontal rod is to the fore and the other side is to the aft of the vehicle, wherein the four horizontal rods are coupled to the four vertical rods;
    e. four extending and retracting horizontal rods to the fore of the vehicle, wherein the extending and retracting horizontal rods are bidirectional and slidably coupled to the four horizontal rods and wherein the four extending and retracting horizontal rods are also coupled to respective vertical rods;
    f. four extending and retracting horizontal rods to the aft of the vehicle, wherein the extending and retracting horizontal rods are bidirectional and slidably coupled to the four horizontal rods and wherein the four extending and retracting rods at the aft are also coupled to two vertical rods;
    g. four transverse horizontal rods running from side to side fixed to horizontal rods;
    h. a frame that includes at least four horizontal rods mounted in the fore to aft plane and four horizontal rods mounted in a transverse manner along the lateral side to side plane, wherein the upper horizontal rod disposed on the opposite sides of the vehicle are connected by transverse horizontal rods and the lower horizontal rods disposed on the opposite sides of the vehicle are connected by transverse rods and the frame is supported by vertical rods mounted independently to both the upper horizontal rods and the lower horizontal rods; and
    i. at least one motor and motorized drive arrangement to power the movement of the ground contacting modules to move the vehicle over a desired surface in a desired direction and also to power horizontal and vertical extending and retracting rods for raising and lowering the frame of the vehicle and to power the raising and lowering of ground contacting modules, to power the horizontal extending and retracting rods, to lengthen or shorten the length of the vehicle fore to aft and for moving the vehicle over an obstacle and for ascending and descending stairs and for keeping the frame level, wherein at least one motor is coupled to at least the frame.

2. The vehicle in accordance with claim 1, wherein a control mechanism on board or remote actuates the motors.

3. The vehicle in accordance with claim 1, wherein the four transverse horizontal rods running from side to side are independently fixed to vertical rods.

4. The vehicle according to claim 1, wherein the motorized drive arrangement is coupled to each ground contacting module and each motorized drive arrangement operates independently of the others.

5. The vehicle according to claim 1, wherein an additional motorized drive arrangement is coupled to each ground contacting module to power the extending and retracting of its respective lower vertical rod.

6. The vehicle according to claim 1, wherein an additional motorized drive arrangement is coupled to at least one horizontal rod to power the extending and retracting of its respective horizontal extension rod.

7. A vehicle according to claim 1, wherein the vehicle is capable of receiving user control to cause the unit to be propelled to move as desired by the user.

8. A vehicle in accordance with claim 1, wherein the vehicle is capable of receiving control remotely by wireless to cause the vehicle to be propelled to move as desired by a remote user or a remote processor.

9. A vehicle in accordance with claim 1, wherein sensors are coupled to a processor and controller.

10. A vehicle in accordance with claim 1, wherein at least one power supply is included to power the motor(s) and provide power to the processor, controller and sensors.

11. A vehicle in accordance with claim 1, wherein a signal communications system which may be wired or wireless connects the sensors, processor, controller, receiver, ground contacting modules, motors and drive train.

12. A vehicle in accordance with claim 1, wherein the transverse rods are mechanically and movably coupled to extending and retracting transverse rods to permit widening and narrowing of the frame.

13. A vehicle in accordance with claim 1, wherein the horizontal rods that form the frame and are positioned between the transverse rods are mechanically and movably coupled to extending and retracting horizontal rods to permit the lengthening and shortening of the frame from fore to aft.

14. A vehicle in accordance with claim 1, wherein the extending and retracting rods are powered electrically, pneumatically or hydraulically.

15. A vehicle in accordance with claim 1, wherein the motors can be electric, or powered by fuel cells, gasoline, other fossil fuel or air or steam.

16. A vehicle in accordance with claim 1, wherein the ground contact mechanisms include wheels.

17. A vehicle in accordance with claim 1, wherein a plurality of vertical rods are mounted on the frame.

18. A vehicle in accordance with claim 1, wherein a plurality of vertical rods are mounted on fixed horizontal rods.

19. A vehicle for transporting humans, robots and a payload, moving on a surface, over obstacles and for ascending and descending stairs, the vehicle comprising:
   a. a multiplicity of ground contacting modules capable of moving over an underlying surface in desired directions, each independently mounted at the base of at least one lower vertical rod that extends and retracts;
   b. a multiplicity of lower vertical rods that extend and retract from and are movably coupled to their respective vertical rods, wherein the bidirectionally moving lower vertical rods, when powered can raise the frame off the surface when extended, or lower the frame when retracted, or can raise or lower the individual ground contacting modules;
   c. a multiplicity of vertical rods capable of supporting the frame, a rider and a payload, arranged on two lines arrayed fore to aft wherein at least one vertical rod to the fore of the vehicle is mounted on the horizontal extending and retracting rods to the fore of the vehicle, at least one vertical rod is mounted on the frame and at least one of the vertical rods is mounted to the aft of the vehicle on at least one horizontal extending and retracting rod to the aft of the vehicle;
   d. a multiplicity of horizontal rods positioned fore to aft such that one side of each horizontal rod is to the fore and the other side is to the aft of the vehicle, wherein the multiplicity of horizontal rods are coupled to a multiplicity of vertical rods;
   e. a multiplicity of extending and retracting horizontal rods to the fore of the vehicle, wherein the extending and retracting horizontal rods are bidirectional and movably coupled to the horizontal rods and wherein the extending and retracting horizontal rods are also coupled to a multiplicity of vertical rods;
   f. a multiplicity of extending and retracting horizontal rods to the aft of the vehicle, wherein the extending and retracting horizontal rods are bidirectional and movably coupled to a multiplicity of horizontal rods and wherein the multiplicity of extending and retracting rods at the aft are also individually coupled to a multiplicity of vertical rods;
   g. a multiplicity of transverse horizontal rods running from side to side fixed to horizontal rods;
   h. a frame that includes a multiplicity of horizontal rods mounted in the fore to aft plane and a multiplicity of horizontal rods mounted in a transverse manner along the lateral side to side plane, wherein the upper horizontal rod disposed on the opposite sides of the vehicle are connected by transverse horizontal rods and the lower horizontal rods disposed on the opposite sides of the vehicle are connected by transverse rods and the frame is supported by a multiplicity of vertical rods mounted independently to both the upper horizontal rods and the lower horizontal rods; and
   i. at least one motor and motorized drive arrangement to power the movement of the ground contacting modules to move the vehicle over a desired surface in a desired direction and also to power horizontal and vertical extending and retracting rods for raising and lowering the frame of the vehicle and to power the raising and lowering of ground contacting modules, to power the horizontal extending and retracting rods, to lengthen or shorten the length of the vehicle fore to aft and for moving the vehicle over an obstacle and for ascending and descending stairs and for keeping the frame level, wherein at least one motor is coupled to at least the frame.

20. A method of using a transporter to transport at least one of a user, robot and payload in a stable manner, the method comprising:
   propelling the transporter in a desired direction over an underlying surface or over obstacles or in the ascent or descent of stairs, the transporter includes eight ground contacting members, eight lower vertical rods that extend and retract, eight vertical rods, four transverse rods, four horizontal rods arrayed fore to aft, eight extending and retracting horizontal rods, a frame, at least one platform, at least one motor, at least one power supply, at least one processor, at least one controller and a motorized drive arrangement; and
   operating the transporter and actuating at least one motor to power one or more of the ground contacting members and at least one of the one or more lower vertical rods that extend and retract and one or more extending and retracting horizontal rods.

21. A method according to claim 20, wherein the transporter is capable of receiving user control to cause the unit to be propelled to move as desired by a user.

22. A method in accordance with claim 20, wherein the transporter is capable of receiving control remotely by wireless to cause the vehicle to be propelled to move as desired by a remote user or remote processor.

23. A method in accordance with claim 20, comprising extending the horizontal extending and retracting rods to position a set of ground contacting modules distally from the frame to support the frame wherein an obstacle is positioned between the frame and the set of ground contacting modules connected to the horizontal extending and retracting rods.

24. A method in accordance with claim 20, comprising extending the horizontal extending and retracting rods and extending the vertical rods to lift the frame with respect to an obstacle or a stair to position a set of ground contacting modules distally past the obstacle or upon a stair not immediately proximate to the frame.

* * * * *

UNITED STATES PATENT AND TRADEMARK OFFICE
CERTIFICATE OF CORRECTION

PATENT NO. : 7,246,671 B2 Page 1 of 1
APPLICATION NO. : 11/032252
DATED : July 24, 2007
INVENTOR(S) : Goren et al.

It is certified that error appears in the above-identified patent and that said Letters Patent is hereby corrected as shown below:

Claim 22, Col. 26, line 42: delete "vehicle" and insert -- transporter --

Signed and Sealed this

Twentieth Day of November, 2007

JON W. DUDAS
*Director of the United States Patent and Trademark Office*